INVENTORS
DIETER GOETZE
JOHN N. HAMILTON
RICHARD S. CARLSON
BY
ATTORNEY

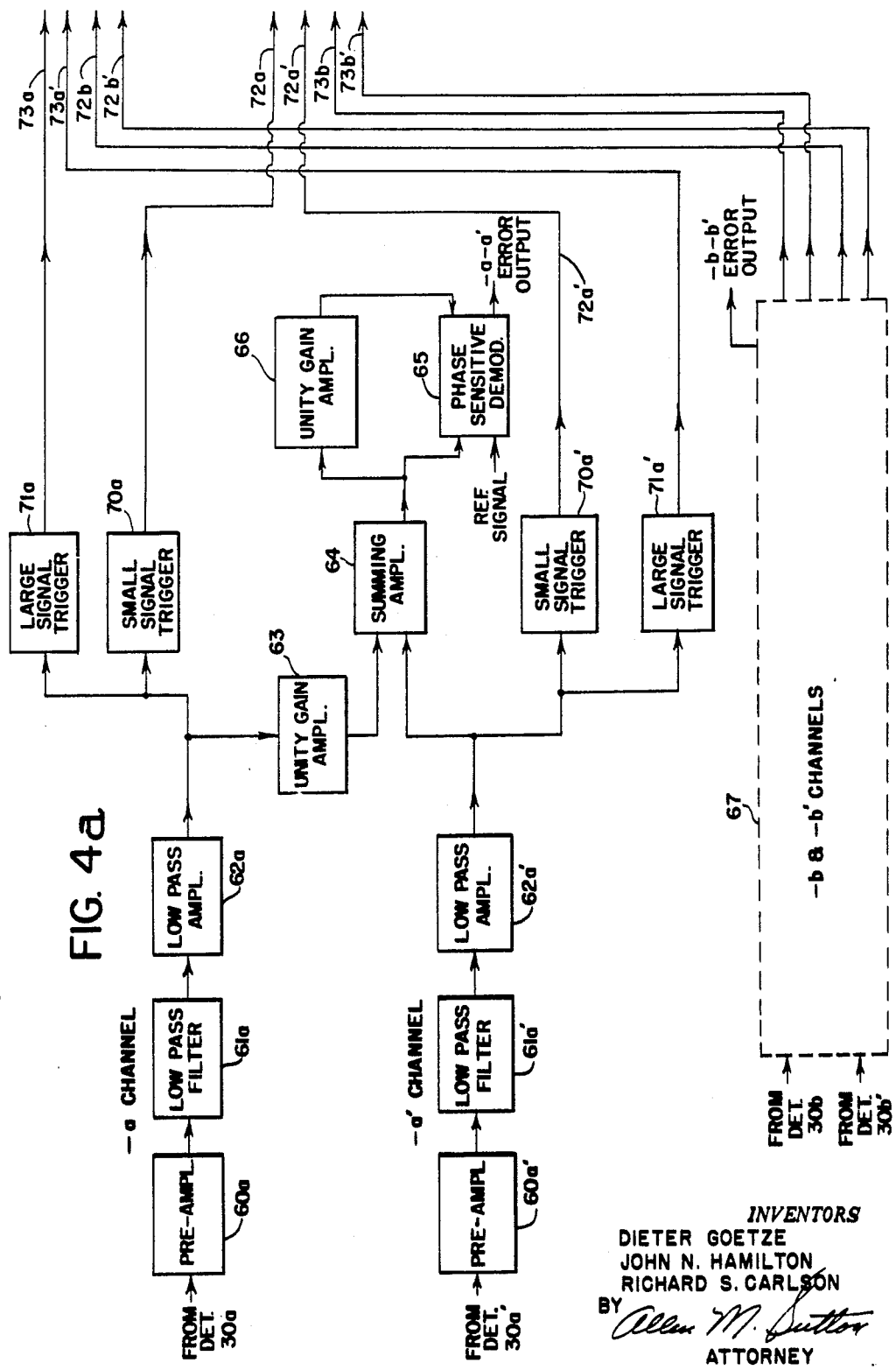

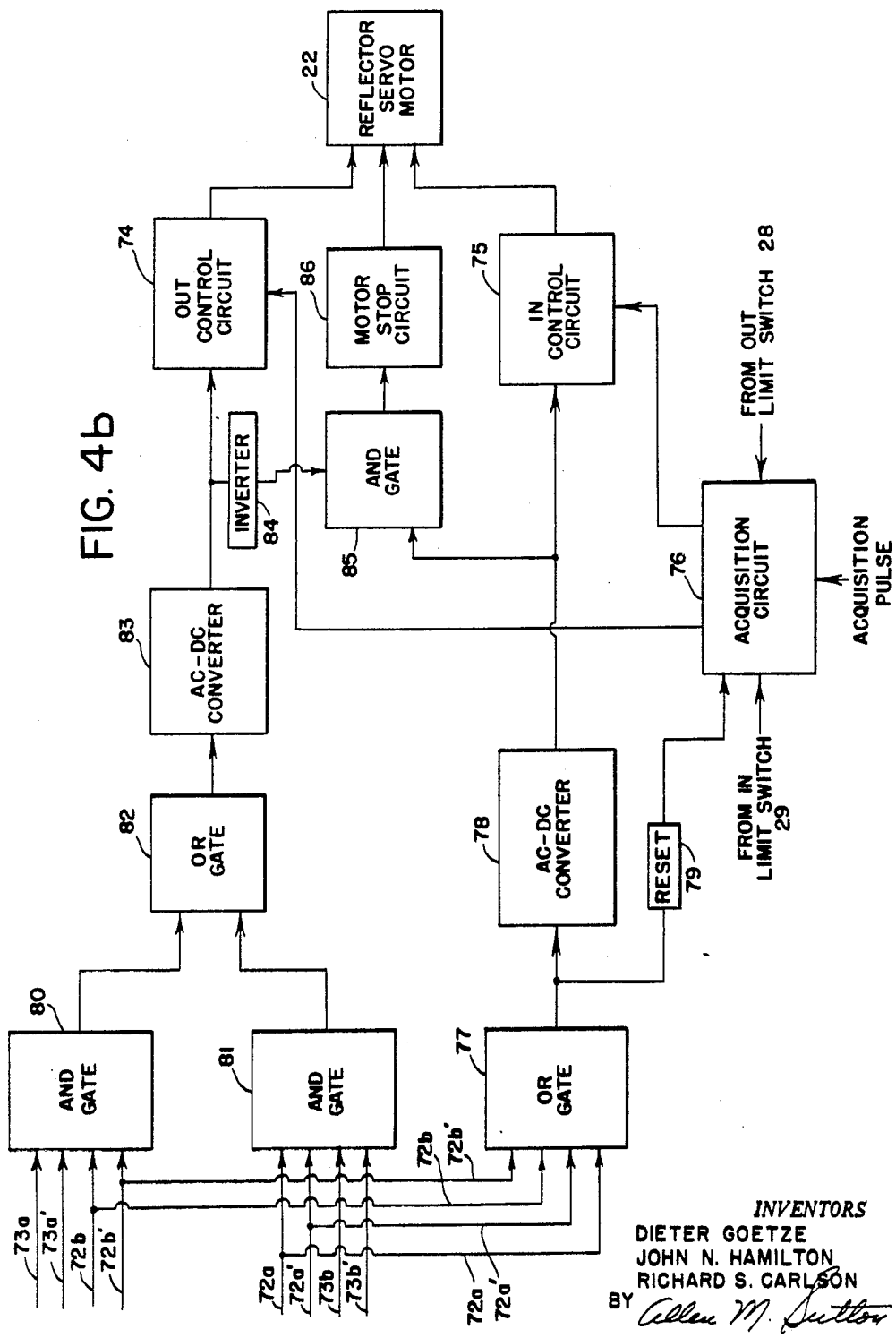

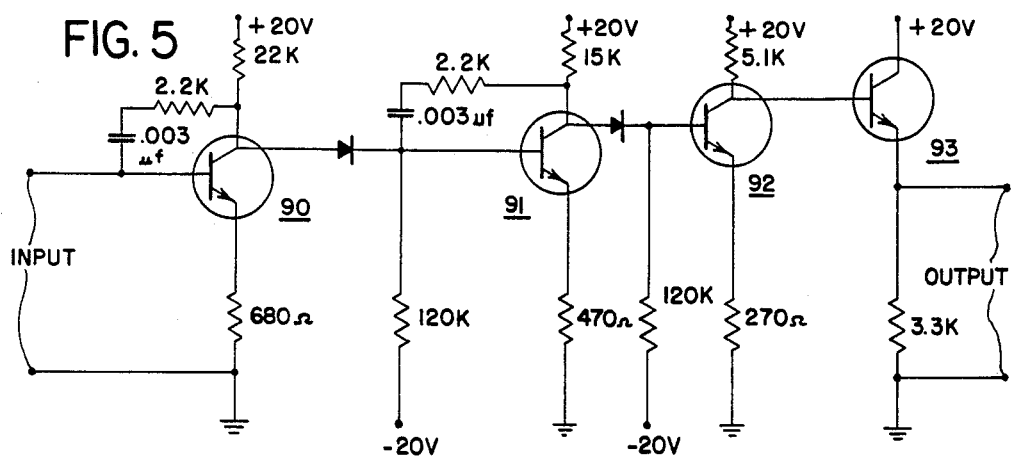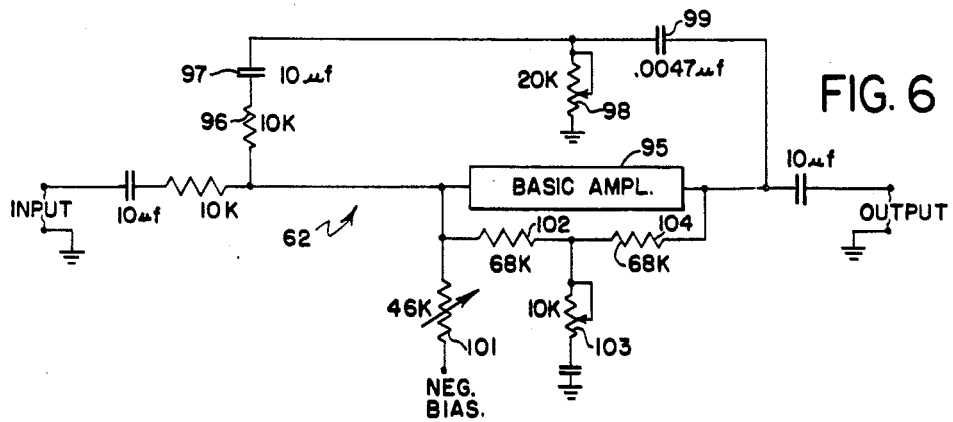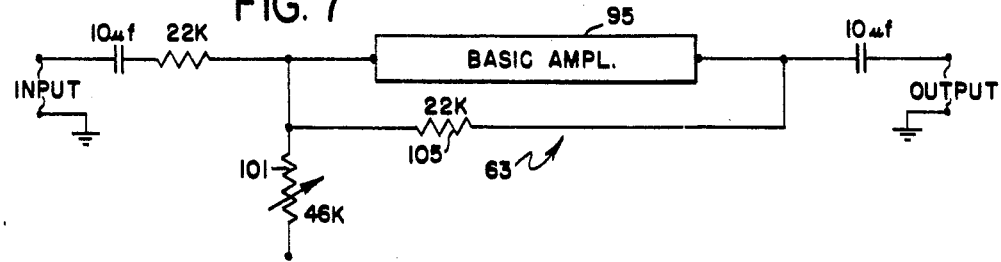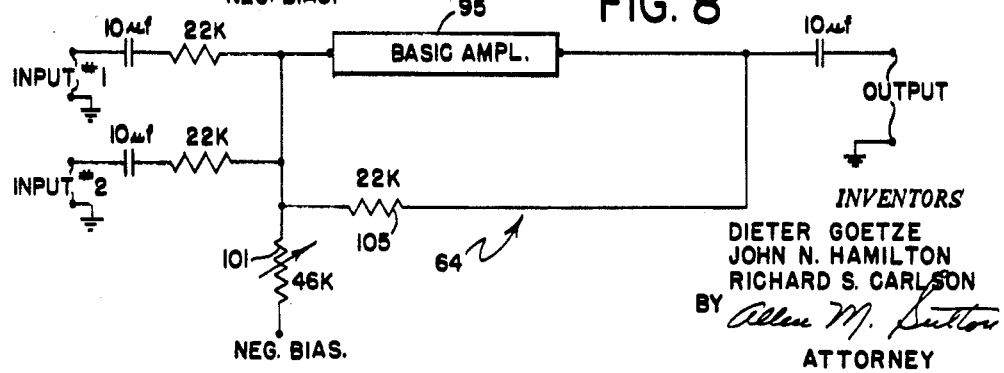

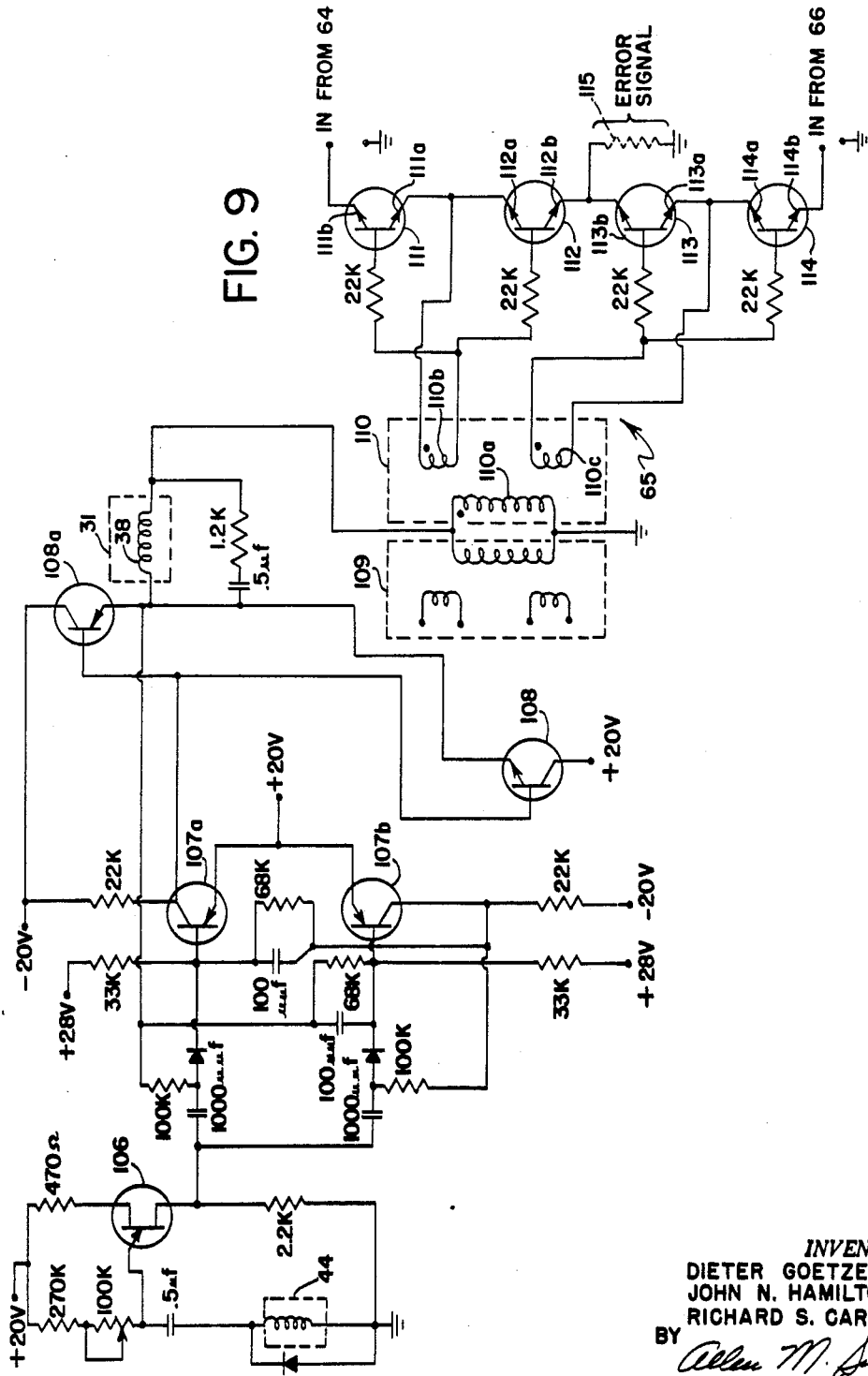

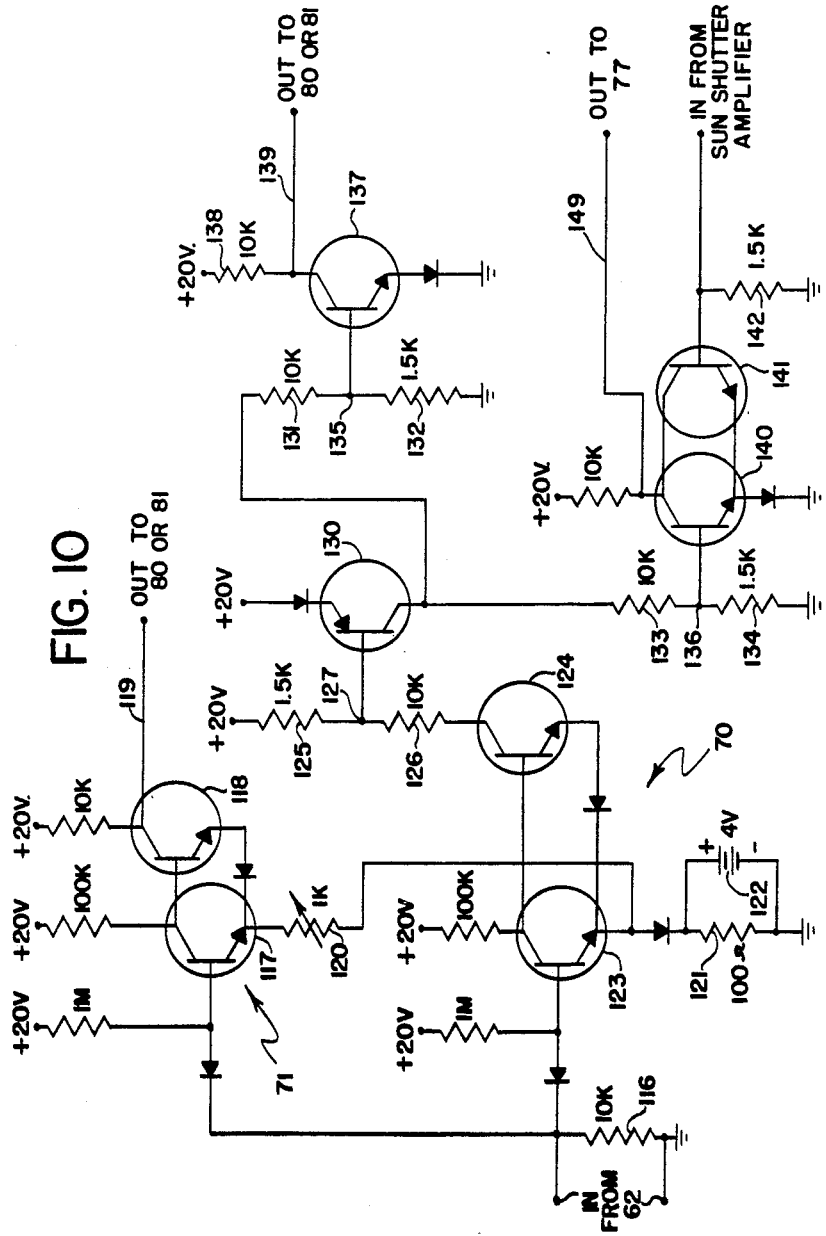

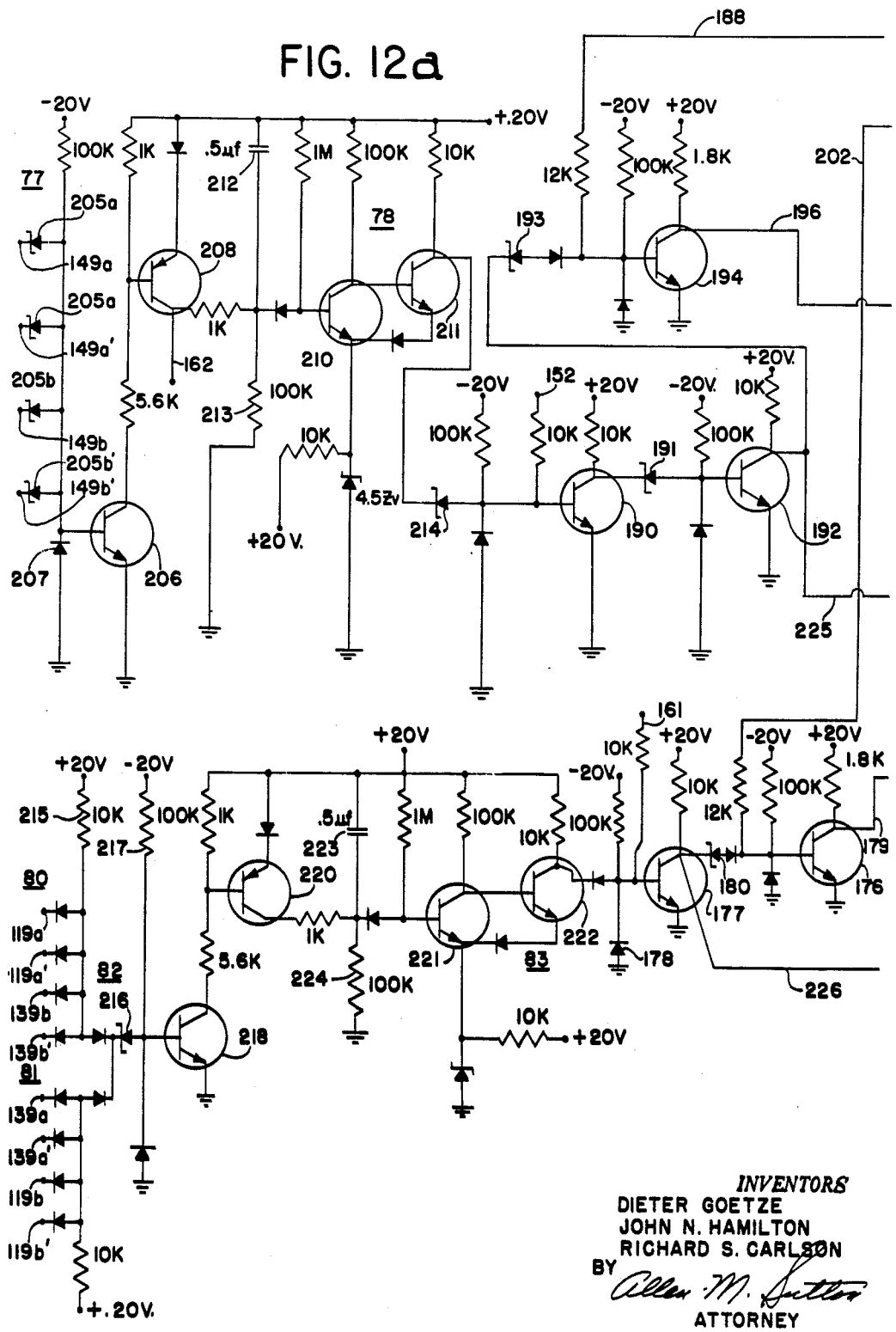

United States Patent Office
3,230,376
Patented Jan. 18, 1966

3,230,376
ELECTRO-OPTICAL RADIANT ENERGY DETECTING APPARATUS FOR DETERMINING ITS LINE OF SIGHT
Dieter Goetze, Hopkins, and John N. Hamilton, Minneapolis, Minn., and Richard S. Carlson, Silver Spring, Md., assignors, by mesne assignments, to Litton Systems Inc., Beverly Hills, Calif., a corporation of Maryland
Filed Oct. 16, 1961, Ser. No. 145,318
14 Claims. (Cl. 250—203)

This invention relates to radiant energy detecting apparatus, and more particularly to an electro-optical apparatus for generating signals indicative of the dynamic relationship, in each of two rectangularly related coordinate planes, of the line of sight between the apparatus and a target, to a predetermined reference axis through the apparatus.

In the field of space navigation it is generally desirable to have apparatus for mounting in a vehicle which will provide information about the attitude of the vehicle relative to a celestial body, such as the earth, a satellite, or a planet. This information may be utilized to adjust the attitude of the space vehicle relative to the body, or it may be used in other ways such, for example, as in pointing an antenna directly at the body. Apparatus of this type, which has been available heretofore, has been subject to a number of disadvantages. Many of them have been restricted in their angular field of view or have employed principles which yield inaccuracies when the radiation emanating from the target being sensed is non-uniformly distributed over the surface of the target. Many such devices have had large bulk and excessive weight and, in most cases, have employed continuously moving elements which results in a continuous large power drain.

Accordingly, it is a primary object of the present invention to provide radiant energy detecting apparatus which obviates the disadvantages of those heretofore known.

It is another object of the invention to provide a detecting apparatus which is simple to operate, accurate in its measurements, compact and light weight.

It is a further object to provide such an apparatus which has a very wide angular field of view compared to such apparatus presently known, and in which the moving mechanism operates only when there is a difference between the line of sight of the apparatus and the predetermined reference axis through the apparatus.

It is a further object to provide such an apparatus which may be easily adapted to act as an altimeter or as a rate of change of altitude sensor.

It is a still further object of the invention to provide such an apparatus which is especially adapted to obtain information from a body which is ellipsoidal in shape or whose image is elliptical.

Further objects and advantages of the invention will become apparent as the description of an embodiment thereof proceeds.

A radiant energy detecting apparatus constructed in accordance with the teachings of the invention includes a sensing head having four detectors arranged in such a manner that they serve as optical calipers acting upon the edge of the image of a target, such as a celestial body, along two mutually perpendicular image diameters. The caliper or pincer-like action is obtained by means of four servo driven reflectors, symmetrically arranged about the reference axis of the sensing head, and pivotal about axes lying in a plane normal to the reference axis. Thus, the reflectors direct radiation emanating from four locations spaced 90° apart along the edge of a celestial body into four detectors. Receipt or non-receipt of radiation at these detectors is processed by the apparatus in such a manner as to yield error information which is precise in regard both to direction and magnitude of the angular difference, in each of two mutually perpendicular planes, between the line of sight between the sensing head and a target and the reference axis through the head.

In operation, if all four detectors are simultaneously energized, the reflectors are pivoted so as to move the angle of view of the detectors outward. If all four detectors are simultaneously not energized, the reflectors are pivoted in a direction to decrease the angle of view. If the four detectors are energized inequally, error signals are generated which are suitable for attitude control. Furthermore, if the body being viewed is elliptical in shape so that two of the detectors are energized and two are not, means are provided to prohibit movement of the reflectors until the amount of radiation incident on the detectors is above or below certain predetermined limits.

A better understanding of the invention will be obtained from the following description of one embodiment thereof, taken in conjunction with the accompanying drawings, in which FIGURE 1 is a diagrammatic elevational view, partly in section with parts broken away, of a sensing head constructetd in accordance with the teachings of the invention;

FIGS. 4a and 4b are a block diagram of the logic of the electronic circuitry of the apparatus;

FIGS. 5, 6, 7 and 8 are circuit diagrams of a basic amplifier, a low-pass amplifier, a unity gain amplifier, and a summing amplifier, respectively, which may be utilized in the apparatus;

FIG. 9 is a diagram of a phase-sensitive demodulator circuit for providing error signals from the apparatus;

FIG. 10 is a diagram of a Schmitt trigger circuit which may be employed in the apparatus;

FIGS. 12a and 12b are diagrams of the circuitry for controlling the pivotal movement of the reflectors of the sensing head.

Figure 1:
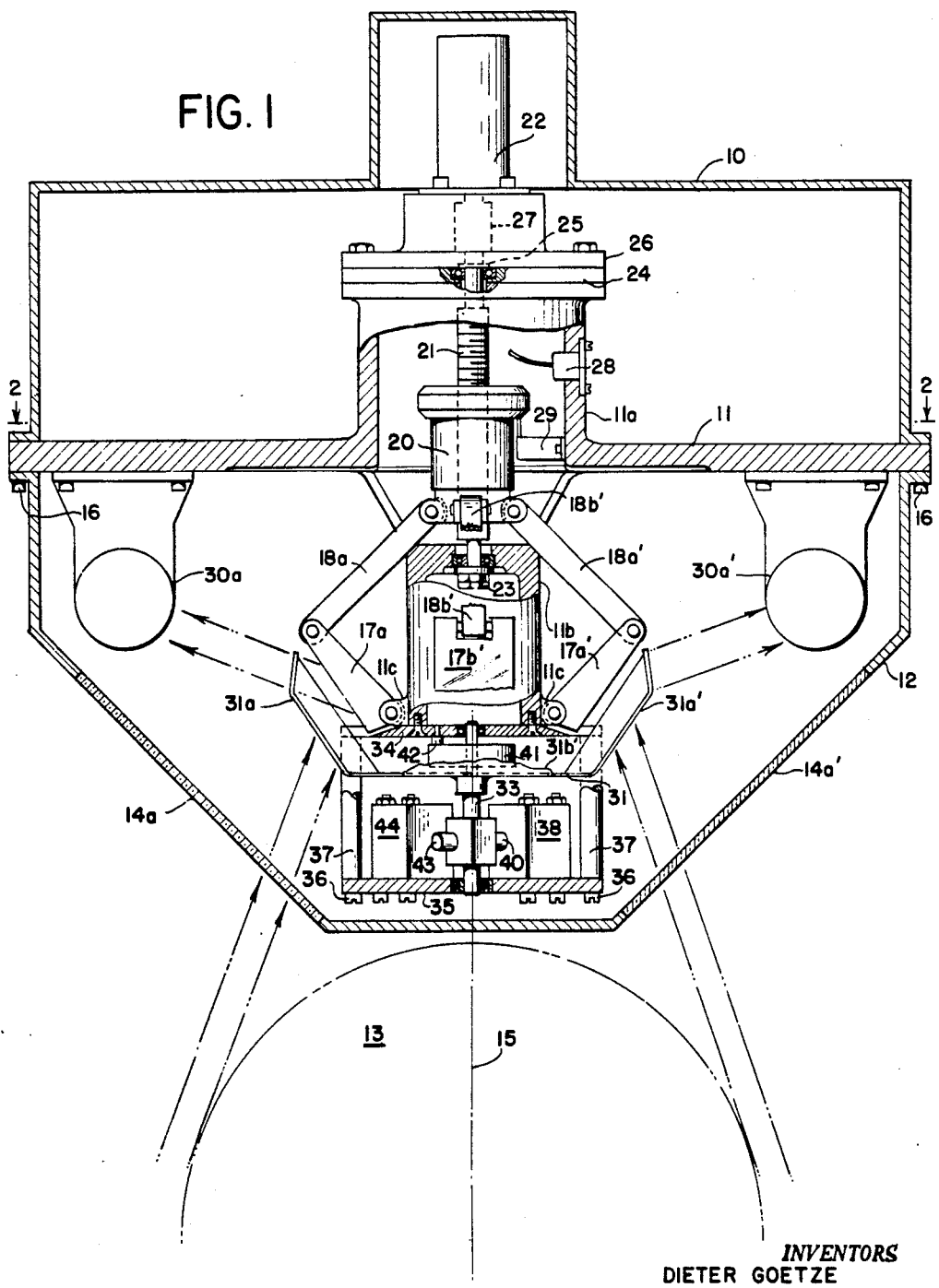

The sensing head, which contains all of the optical and mechanical parts of the energy detecting apparatus, will be described first with reference to FIGS. 1, 2 and 3. The various parts which comprise the sensing head are mounted inside a housing which includes a rear cover 10, a mounting plate 11, and a forward cover 12. Radiation from a celestial body or target 13 enters the sensing head through a plurality of windows 14a, 14a', 14b, 14b', arranged in quadrature about a reference axis 15 of the sensing head. In the present embodiment of the invention, the senning head is adapted to respond to infrared energy, so the windows 14 may conveniently be made of germanium. The windows serve no special optical purpose, but act merely to isolate the interior of the sensing head from the exterior environment.

The mounting plate 11, which supports all of the moving parts of the sensing head, is secured by conventional means such as bolts 16 between flanges formed on the rear cover 10 and the forward cover 12. The mounting plate 11 is formed with an upstanding cylindrical portion 11a and a depending inverted cup-shaped portion 11b. The depending portion 11b of the mounting plate has four pairs of lugs 11c formed on its bottom or forward end, with the positions of the four pairs corresponding to the positions of the windows 14 in the forward cover 12. Reflectors such as mirrors 17a, 17a', 17b, 17b', are pivotally mounted at their lower ends between the lugs of the pairs with the mirrors 17a, 17a', 17b, 17b', arranged to receive radiation passing into the sensing head through the windows 14a, 14a', 14b, 14b', respectively. Thus, the mirrors are mounted in pairs on opposite sides of and equidistant from the reference axis 15, the four mirrors being arranged in quadrature about the reference axis with their pivotal axes lying in a plane normal to the reference axis. Of course, the mirrors are all aluminized or silvered on their front surfaces; that is, on the surfaces nearest the front cover 12.

The upper ends of the mirrors 17a, 17a', 17b, 17b', are pivotally connected to the lower ends of links 18a, 18a', 18b, 18b', respectively, and the upper ends of the links are pivotally connected to the lower end of a traveling nut assembly 20. The traveling nut assembly travels on a screw 21 which is rotated by means of a servo motor 22. The lower end of the screw 21 is supported in suitable bearings in the top of the depending portion 11b of the mounting plate, and a nut 23 threaded on the reduced diameter end of the screw 21 prevents axial movement of the screw in one direction. The upper end of the screw 21 is rotatably supported in suitable bearings in a plate 24 secured to the upper end of the cylindrical portion 11a of the mounting plate, and a retaining ring 25 around the end of the screw 21 outside the bearings cooperates with the nut 23 on the other end of the screw to prevent axial movement. An inverted cup-shaped member 26 is mounted on top of the plate 24 and the motor 22 is mounted on top of the member 26. The purpose of the member 26 is to enclose a flexible coupling 27, which connects the upper end of the screw 21 to the rotor of the servo motor 22. Thus, as the motor 22 rotates the screw 21, the upper ends of the mirrors 17 are caused to move inwardly or outwardly depending on the direction of rotation of the motor. An upper limit switch 28 and a lower limit switch 29 are mounted on the wall portion 11a and are adapted to be actuated by the traveling nut assembly 20 at its upper and lower limits of travel, respectively.

The means for receiving the energy emanating from a target and reflected from the mirrors takes the form of four detector units 30a, 30a', 30b, 30b', arranged in fixed position to receive the radiation from the mirrors 17a, 17a', 17b, 17b', respectively. Thus, because the detectors 30 are fixed in position, as the screw 21 rotates in one direction or the other, the position of the mirrors will be changed either to increase or decrease simultaneously and in synchronism the angle of view between the two detectors of each pair. As illustrated in FIG. 1, the angle of view between the detectors 30a and 30a' is approximately 40°. However, the degree of movement of the traveling nut assembly 20 is such that each mirror can pivot through approximately 45°, thus causing the angle of view of each pair of detectors to be variable from less than 1° to approximately 180°. This has not been possible with devices of this type heretofore known.

If radiation were continually incident on the detectors, it is possible that the radiation from a small target would be effectively masked by the background radiation. Therefore, in order to eliminate ambient or background radiation, a chopper 31 is provided having four oscillating blades 31a, 31a', 31b, 31b', which oscillate back and forth between the mirrors 17 and the windows 14. The oscillating vanes are provided with a reflecting coating on their outer surfaces so that they block the radiation originating at the target being scrutinized, and at the same time reflect radiation from space into the detectors when they are in front of the mirrors. Thus, the output signal from each detector, if a target is in its field of view, is an alternating current signal superimposed upon a steady direct current signal. By using alternating current devices to operate upon the signals from the detectors, the signal due to the background radiation is effectively eliminated.

The chopper 31 is fixedly mounted on a shaft 33, whose upper end is rotatably mounted in suitable bearings in an upper base plate 34 that is affixed to the lower end of the projection 11b. The lower end of the shaft 33 is rotatably mounted in conventional bearings in a lower base plate 35. The lower base plate 35 is secured to the upper base plate 34 by means of long screws 36 surrounded by spacers 37 of the proper length. The chopper is caused to oscillate by means of an electromagnet 38 secured to the lower base plate 35. The electromagnet 38 serves to alternately attract and repel a magnet 40 secured to the lower end of the shaft 33. The electromagnet 38 acts against the force of a helical spring 41, which is disposed about the shaft 33, having one end connected to a pin 42 set in the upper base plate 34, and its other end connected to the shaft 33. It has been found in practice that a frequency of oscillation of approximately thirty cycles per second is satisfactory for the chopper.

Also connected to the lower end of the shaft 33, opposite the magnet 40, is a magnet 43 which acts upon a detector 44 to produce an alternating synchronizing voltage as the magnet oscillates back and forth past the detector.

Figure 2:
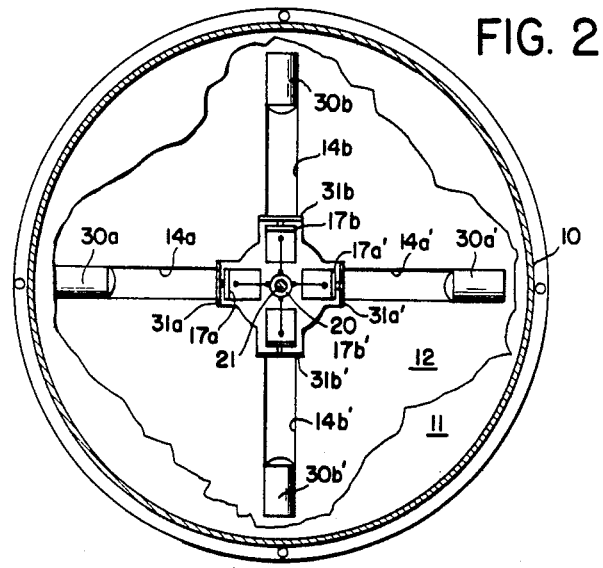
FIG. 2 is a sectional view taken on the line 2—2 of FIG. 1, with parts broken away for clarity.
Figure 3:
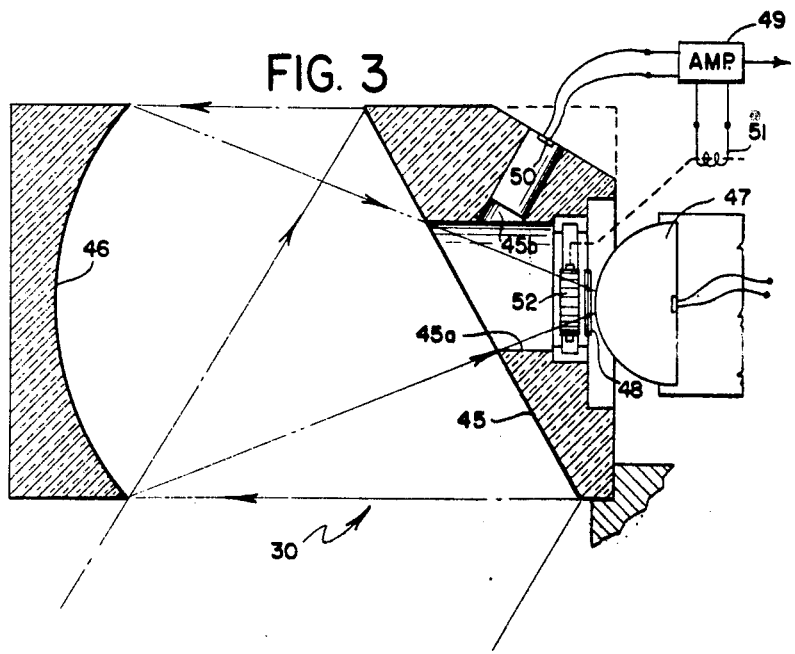
FIG. 3 is a diagrammatic view of a detector unit utilizable in the sensing head shown in FIG. 1.

FIG. 3 illustrates diagrammatically a detector unit 30 suitable for use in the sensing head shown in FIGS. 1 and 2. The particular embodiment shown in FIG. 3 is adapted for use as an infrared detector, but substantially the same arrangement can be used for detecting other forms of radiant energy. Radiation incident on the detector is first reflected from a plane mirror 45 having an aperture 45a in its center. The reflected radiation falls upon a concave spherical mirror 46 which focuses it onto an immersed thermistor bolometer 47, disposed behind the aperture 45a in the plane mirror 45. A thermistor bolometer immersed in a germanium lens is chosen in this embodiment because of its ability to respond to very long infrared radiation (12.5 microns and beyond) and because of its low noise output. A spectral filter 48 may be utilized in front of the bolometer 47 to reject radiation of shorter wave lengths than 12.5 microns, if desired.

If the direct rays of the sun were allowed to impinge upon the bolometer 47, it might well be permanently damage. Therefore, to prevent such an occurrence, a small aperture 45b is provided in the body of the mirror 45, and a lead sulfide wafer 50 is located therein to form, in effect, a pinhole camera having a field of view somewhat greater than that of the bolometer 47. The output of the lead sulfide cell 50, after suitable amplification by a conventional amplifier 49, may be utilized to energize a solenoid 51 which, when energized, interposes an opaque sun shutter 52 in front of thermistor bolometer 47, thereby protecting the element from the intense solar radiation. The sun shutter 52 need not be opaque, but, if desired, it may be an attenuator. In such a construction, the apparatus could then function as a sun tracker.

It is particularly pointed out that the sensing head with the detector of FIG. 3 embodied therein is adapted to detect infrared radiant energy. However, the invention is in no way limited to the use of that particular detector, nor to the detection of any particular type of radiant energy. The thermistor bolometer 47 may be easily replaced by a conventional photo cell for the detection of visible radiant energy. Likewise, by the use of a proper detector, ultraviolet radiant energy may be detected.

Having now described the sensing head including the two pairs of detectors, the synchronously pivotal pairs of reflectors for simultaneously changing the angle of view of the two detectors of each pair, and the chopper for causing the detectors to provide an alternating output signal in response to radiant energy incident thereon from a target, we may proceed to look at the electronic means for processing the output signal from the four detectors. The electronic portion of the apparatus of the invention has several functions to perform. First, it must actuate the servo motor to pivot the mirrors, thus changing the angle of view of the detectors in order to acquire a target. This function is provided by digital circuitry. Secondly, it must operate on the signals provided by the detectors to provide error signals indicative of the relationship between the line of sight of the sensing head to a target and the predetermined reference axis of the head. This information is provided through the use of analog circuitry. Also, because it is unlikely that any celestial body is perfectly round, a "dead zone" is electronically created within which the mirror positioning servo motor is commanded to be quiescent. This prevents "hunting," which would occur when the two sets of detector pairs are commanded to acquire a noncircular target. In addition, if the sun enters the field of view of any of the four detectors, and the sun shutter is interposed in front of the bolometer, the logic circuitry is so altered that tracking can be performed with the three remaining detectors; an artificial signal is fed into the disabled circuitry to simulate correct tracking.

FIGS. 4a and 4b show the logic of the electronic circuitry in block diagram form, while FIGS. 5–12 show the circuitry in detail. It will be helpful to consider first the block diagram shown in FIGS. 4a and 4b.

It will be recalled that in the optical-mechanical description of the sensing head the same suffixes are used to designate elements that cooperate in each of the four channels to direct radiation onto the four detectors. In other words, the window 14a, the chopper blade 31a, the mirror 17a, and the detector unit 30a, cooperate to provide an alternating current signal from the detector whose amplitude is indicative of the amount of radiation incident on that detector. Similarly, the other channels are designated by the suffixes -a', -b, and -b', with the channels designated -a and -a' being opposed and cooperating to provide an error signal indicative of the dynamic relationship, in one of two rectangularly related coordinate planes, of the line of sight between the sensing head and a target, to the predetermined reference axis through the head. Similarly, the channels designated -b and -b' cooperate to provide an error signal indicative of the relationship in the other of the two rectangularly related coordinate planes. Those same channel designations may conveniently be carried into the description of the logic of the electronic circuitry shown in FIGS. 4a and 4b. Since the -a and -a' channels are identical to the -b and -b' channels, only the -a and -a' channels will be described. It is not until after the four channels enter the servo motor control portions of the circuitry (FIG. 4b) that all four need be considered in detail.

As seen in FIG. 4a, the output signals from the detectors 30a and 30a' in the sensing head are fed to preamplifiers 60a and 60a', respectively, which are preferably located in the sensing head. The preamplifiers 60 may be of conventional commercially-available design and should have gains of approximately 20 in order to amplify the detector output signals for transmittal from the sensing head to the electronic circuitry of the apparatus. The output signals from the preamplifiers 60a, 60a', then pass through low-pass filters 61a, 61a', respectively, which are conventional two-section resistance-capacitance filters having upper cutoff frequencies of approximately 100 cycles per second. These filters limit the noise bandwidth of the system, thus allowing increased sensitivity.

The signals are then amplified by low-pass amplifiers 62a and 62a', respectively, which have cutoff frequencies (at the 3 decibel point) of approximately 100 cycles per second and gains of approximately 100.

The error signal for the -a and -a' channels is obtained by inverting the signal in the -a channel, adding together the -a and -a' signals to produce an alternating current (A.C.) sum signal, and utilizing a phase-sensitive demodulator to provide a direct current error output signal, the polarity of which depends upon the input phase of the sum signal with reference to a reference signal. The output signal of the low-pass amplifier 62a is passed through a unity-gain amplifier 63 to invert the signal, which is then added to the output signal of the low-pass amplifier 62a' by means of a summing amplifier 64. Thus, if there is no output from the summing amplifier 64, it indicates either that there is no output signal being provided by either detector 30a or detector 30a', or that the output signals produced by the two detectors are equal. If the output signals from the two detectors are of different amplitudes, the summing amplifier 64 will provide an output signal whose phase is dependent upon which detector output signal is larger.

A direct current (D.C.) error signal output is provided from a phase-sensitive demodulator 65 which has three input signals. One of the input signals comes directly from the output of the summing amplifier 64, another comes from a unity-gain amplifier 66 which serves merely to invert the signal from the summing amplifier 64, and a third signal, which is a phase reference signal, is provided from the chopper driving circuitry. Thus, the polarity of the output of the phase-sensitive demodulator 65 depends upon the phase of the input signals received from the summing amplifier 64 and the inverting unity-gain amplifier 66, and its magnitude is indicative of the angular difference between the line of sight to the target and the reference axis in that coordinate plane which corresponds to the opposed channels -a and -a'.

As previously mentioned, circuitry identical with that just described is provided in the -b and -b' channels, which circuitry is indicated by a block 67, and which functions to provide a -b—b' error output signal. That output signal is indicative of the angular error or difference between the line of sight between the sensing head and the target to the predetermined reference axis through the sensing head in the second of the two rectangularly related coordinate planes.

The remainder of the elements shown in the block diagram of FIG. 4a are for the purpose of providing signals to the reflector drive motor control circuitry in response to certain predetermined relationships between the output signals of the four detectors 30. As previously pointed out, such control means are necessary because of the noncircular or elliptical outline of many celestial bodies. The control signals are provided from a plurality of bistable multivibrators designated as 70 and 71.

Each signal channel is provided with two trigger circuits the -a channel having trigger circuits 70a and 71a, the -a' channel having trigger circuits 71a' and 70a', and the -b and -b' channels being provided with similar circuits (not shown). The function of the two trigger circuits in each channel is to receive the approximate 30 cycle per second sine wave signal from the corresponding low-pass amplifier 62 and to convert that signal into a square wave output signal from one or both circuits when the input sine wave exceeds one or both of two predetermined amplitude levels.

In the present case the signal trigger circuits 70 and 71 are all comprised of Schmitt trigger circuits, which have a fast switching time and provide a substantially square wave output signal. In addition, a Schmitt trigger circuit may be so designed and adjusted that it will produce an output signal only when the input signal exceeds a predetermined amplitude level. In practice, the small Schmitt trigger circuit 70 in each channel might be set to be triggered at a level where the output signal from its corresponding detector is slightly less than half of the maximum detector output signal, and the large Schmitt trigger circuit 71 would be set to operate when the output signal from the detector is slightly greater than half of the maximum output signal possible. Thus, as will become more apparent later in the description, a "dead zone" is created by the settings of the two Schmitt trigger circuits in each channel with the width of the dead zone being determined by the difference in settings, which would be determined by the amount of ellipticity of the target being sought.

The output signals from the small Schmitt trigger circuit in each channel are shown as appearing on leads 72a, -a', -b, -b', and the output signals from the large Schmitt trigger circuit 71 are shown as appearing on leads 73a, -a', -b, -b'. These leads match similarly designated leads appearing at the left-hand side of FIG. 4b.

Looking now at FIG. 4b, it is seen that the servo motor 22, previously mentioned in connection with FIG. 1, is shown in block form at the extreme right of the figure. Energizing means for causing the servo motor to rotate in one or the other direction are provided by an OUT control circuit 74 and by an IN control circuit 75. The OUT control circuit 74 provides a signal of the proper polarity to cause the servo motor 22 to rotate in a direction to increase the angle of view between the two detectors of each pair. Conversely, the IN control circuit 75 energizes the servo motor to cause the angle of view between the mirrors of each pair to be decreased. The IN and OUT control circuits 74 and 75 are themselves controlled by other circuits which respond to the presence or absence of these signals from the detectors 30 or to the relative amplitude values of the signals from the detectors.

Assuming that a target has not yet been acquired, the motor control circuits are controlled by an acquisition circuit 76, which functions to initiate motion to decrease the angle of view between the detectors of the pairs in response to an acquisition pulse received from an external source. If during inward travel of the traveling nut assembly 20 (FIG. 1), a target is not acquired, the IN limit switch 29 is actuated to send a signal to the acquisition circuit 76. Thereupon, the acquisition circuit acts to deenergize the IN control circuit 75 and to energize the OUT control circuit 74, thus causing the servo motor 22 to reverse its direction of rotation and pivot the mirrors in a direction to increase the angle of view between the detectors of the pairs. If a target is not acquired during outward travel when the outer limit of travel is reached, the OUT limit switch 28 sends a signal to the acquisition circuit 76, which then deenergizes the OUT control circuit 74 and the servo motor 22 stops. The servo motor 22 is not again energized until another acquisition pulse is received by the acquisition circuit 76.

If, during the inward travel of the traveling nut assembly 20, a signal of predetermined amplitude is obtained from any one of the four detectors 30, the inward travel is immediately stopped. The output signals of all four of the small signal trigger circuits 70 are connected through the leads 72 to the input of an OR gate 77. Thus, if there is an output signal from any one of the small signal trigger circuits 70, it will pass through the OR gate 77 to an A.C.-D.C. converter 78, where the 30-cycle square wave signal is converted to a D.C. signal which is then used to inhibit action of the IN control circuit 75. The error signals generated by the phase-sensitive demodulator 65 in the -a—a' and -b—b' channels may be utilized in a servo system (not shown) to reorient the attitude of the sensing head. Similarly, if a target is acquired during outward travel, the signal passing through the OR gate 77 actuates a reset circuit 79, which in turn causes the acquisition circuit 76 to stop outward travel.

There are three occasions after a target has been acquired when it is desirable to cause the angle of view of the detectors to be increased. These are if the output signals of the detectors are sufficient to cause output signals from the large signal trigger circuits 71a and 71a' and from the small signal trigger circuits 70b and 70b', or output signals from the small signal trigger circuits 70a and 70a' and from the large signal trigger circuits 71b and 71b', or output signals from all four of the large signal trigger circuits 71. This function is provided by a pair of AND gates 80 and 81, an OR gate 82 and an A.C.-D.C. converter 83. It is seen that the output signals from the large signal trigger circuits 71 in the -a and -a' channels and the output signals from the small signal trigger circuits 70 in the -b and -b' channels are connected to the input of the AND gate 80. Similarly, the output signals from the small signal trigger circuits in the -a and -a' channels and from the large signal trigger circuits in the -b and -b' channels are coupled to the input of the AND gate 81. Thus, if all four signals are present at the input of the AND gate 80, they will pass through the gate and through the OR gate 82 to the A.C.-D.C. converter 83, where the 30-cycle square wave signals are converted to a direct current ouput to energize the OUT control circuit 74. Similarly, if all four signals are present at the input of the AND gate 81, they also will pass through the AND gate 81, the OR gate 82 and the A.C.-D.C. converter 83 to energize the OUT control circuit 74. Thus, in both cases the servo motor 22 will move the traveling nut assembly outwardly to increase the angle of view between the two detectors of each pair until an output signal fails to appear from at least two of the signal trigger circuits 70 and 71.

Positive braking of the servo motor 22 is obtained when there is no IN or OUT drive signal by means of an inverter 84, and AND gate 85, and a motor stop circuit 86. The inverter 84 serves to provide a signal to the AND gate 85 when there is no signal from the A.C.-D.C. converter 83. If there is a signal from the inverter 84 and a signal from the A.C.-D.C. converter 78, they will pass through the AND gate 85 and actuate the motor stop circuit 86, which serves to short-circuit the input to the servo motor 22.

Having considered the mechanical-optical sensing head, and the logic of the electronic control system, we may now turn our attention to the specific electronic circuitry which way be utilized to implement the logic. In many cases, the circuitry shown is quite conventional, and so the description is kept rather brief. Values of the various circuit elements are given as illustrative only, and to assist in understanding operation. They are in no way limiting. First, let us look at the various amplifiers and demodulator which are used to provide the -a—a' and -b—b' error signals. These are shown in FIGS. 5, 6, 7, 8 and 9.

FIG. 5 illustrates a conventional, well-known form of transistor amplifier, comprising three diode-coupled amplifying stages 90, 91, 92, followed by an emitter follower stage 93 for impedance isolation purposes. The amplifier is designed to operate Class A, that is, with linear amplification and, because it has an odd number of amplifying stages, to provide inversion between the input signal and the output signal. In the control circuitry of the invention, the amplifier does not operate independently, as shown in FIG. 5, but is always utilized in conjunction with a feedback network. If independent operation were required, it would be necesary to provide an isolating input capacitor and a negative bias potential on the base of the transistor in the first stage 90 (not shown). The proper biases for the stages 91 and 92 are provided by voltage dividers between +20 volts and −20 volts into which the bases of the transistors of these stages are connected. It is believed that the operation of the amplifier shown in FIG. 5 will be easily understood by one skilled in the art and that no further description is necessary.

It is particularly pointed out that the amplifier shown in FIG. 5 is illustrative only, and the invention is in no way limited to the use of that particular amplifier. However, because of the various feed-back circuits that are used with the basic amplifier to provide the low-pass, unity-gain and summing amplifiers, it is important that the basic amplifier function to provide a signal inversion;

that is, the basic amplifier must have an odd number of stages of amplification.

The low-pass amplifiers, shown as blocks 62 in FIG. 4, may be constructed as shown in FIG. 6. The low-pass amplifier illustrated comprises a basic amplifier 95, which may be the amplifier illustrated in FIG. 5, operating in conjunction with two negative feed-back networks. One network comprising a resistor 96, a capacitor 97, a variable resistor 98, and a capacitor 99 serves to attenuate high frequencies by increasing the negative feed-back of those frequencies. The other network comprising a variable resistor 101, a resistor 102, a variable resistor 103, and a resistor 104 serves to provide negative feed-back of all frequencies in a conventional manner. The variable resistor 103 may be adjusted to obtain the desired gain from the amplifier and the resistor 101 may be adjusted to provide the proper bias at the input stage of the basic amplifier 95. As in the case of the basic amplifier previously described, the operation of the low-pass amplifier of FIG. 6 is believd to be obvious to those skilled in the art and no further explanation is deemed necessary.

FIG. 7 illustrates a unity-gain amplifier suitable for both amplifiers 63, 66 of FIG. 4a, which comprises the basic amplifier 95 with degenerative feed-back provided by a resistor 105. Again, the variable resistor 101, connected between a source of negative potential and the input to the basic amplifier may be adjusted to provide the proper bias on the first stage of the basic amplifier.

FIG. 8 illustrates a summing amplifier, which is identical to the unity-gain amplifier shown in FIG. 7 except that two inputs are provided. Thus, the summing amplifiers 64, shown in FIG. 4a. serve only to add together two signals and invert the sum signal without providing amplification.

As was previously mentioned in connection with FIG. 4a, phase-sensitive demodulators 65 are provided for the -a-a' and —b' channels to provide direct current error signals whose polarity and amplitude are indicative of the direction and magnitude of the angular difference between the line of sight between the apparatus and the target and the reference angle through the apparatus. FIG. 9 illustrates such a phase-sensitive demodulator 65, which operates in conjunction with the means for driving the chopper 30 and with the detector 44, which produces an alternating synchronizing voltage based on the chopper oscillating frequency. The chopper driving means comprises an oscillator, a bi-stable multivibrator, and a power output stage. The saw-tooth oscillator comprises a P-type unijunction transistor 106 having one of its base electrodes connected through a 470 ohm resistor to a +20 volt source and the other of its base electrodes connected through a 2.2K resistor to ground. The emitter of the transistor 106 is connected to the +20 volt source through two resistors, one of which may be variable, and to ground through a 0.5 microfarad capacitor and the coil of the chopper detector 44. In operation, the capacitor in the emitter circuit of the transistor 106 charges positively to the necessary value to start oscillation, at which time, through the action of the multivibrator and the power output stage, the driver coil 38 of he chopper 31 is energized and the chopper starts to oscillate. As the chopper oscillates, it causes a voltage to be induced in the detector 44, which voltage adds to that across the capacitor in the emitter circuit of the transistor 106 and synchronizes the oscillation.

The bi-stable multivibrator is conventional in design and comprises two PNP transistors 107a and 107b. The collector electrode of the transistor 107a is directly connected to the bases of two transistors 108a and 108b, which comprise the power output stage. The transistor 108a is a PNP type having its collector connected to a source of —20 volts and its emitter connected to one end of the driver coil 38 of the chopper 31. The transistor 108b is of the NPN type, having its collector electrode connected to a source of +20 volts and its emitter also connected to the end of the driver coil 38 of the chopper. Thus, as the bases of the transistors 108a, 108b, go alternately positive and negative, the transistors alternately conduit, thus providing an alternating current through the driver coil 38 of the chopper, the other end of which is connected to ground through parallel primary windings of transformers 109 and 110.

The transformers 110 and 109 serve to provide the phase reference signals for the -a—a' and -b—b' error signal channels, respectively, and each operates in conjunction with a phase-sensitive demodulator 65. Since both transformers and phase-sensitive demodulators act in identical fashion, only one will be described, in this case the transformer 110 and its associated demodulator. As noted above, the primary winding 110a of the transformer is connected in series with the driver coil 38 of the chopper. Two secondary windings 110b, 110c, are provided, having polarities with respect to the primary winding as indicated by the dots in the illustration. The transformer 110 operates in conjunction with four transistors 111, 112, 113, 114, which comprise the demodulator. Each of the transistors 111–114 is of the type which, when its base is of the proper polarity with respect to one of the other electrodes, will conduct in either direction. In other words, it acts much as an electronic switch. Transistors 111 and 112 operate as a matched pair, as do transistors 113 and 114. They may conveniently be of the type known as "FSP–1" which comprises two matched transistors packaged together, and are available from Fairchild Semiconductor Corporation, Mountain View, California.

As shown, the upper end of the secondary winding 110b of the transformer is connected directly to an electrode 111a of the transistor 111 and an electrode 112a of the transistor 112. The bottom end of the winding 110b is connected through 22,000 ohm resistors to the bases of the transistors 111 and 112. The upper end of the winding 110c of the transformer is connected through 22,000 ohm resistors to the bases of the transistors 113 and 114, while the lower end of the winding 110c is connected directly to an electrode 113a of the transistor 113 and an electrode 114a of the transistor 114. The output signal from the summing amplifier is connected to the remaining electrode 111b of the transistor 111, and the output signal from the unity-gain amplifier 66 is connected to the remaining electrode 114b of the transistor 114. The error signal is obtained from the juncture of the remaining electrodes 112b and 113b of the transistors 112 and 113, respectively. The output error signal is shown as appearing across a load resistor 115, shown in broken lines, to indicate that it may be an input resistor in a servo followup mechanism or other device.

In explaining the operation of the demodulator circuit 65, it must be remembered that, as shown in the illustration, the upper ends of both secondary windings 110b and 110c are of the same polarity. Thus, with that in mind, let us look at the two different phase relationships the input signals may attain with respect to the reference signal, the reference signal being that which appears across the secondary windings of the transformer 110. First, assume that at the beginning of a cycle the upper end of each of the secondary windings 110b, 110c, is positive, the input signal on the electrode 111b of the transistor 111 from the summing amplifier 64 is positive, and the input signal connected to the electrode 114b of the transistor 114 from the unity-gain amplifier 66 is negative. In that case, the bases of the transistors 111 and 112 are negative, and those two transistors cannot conduct. However, the bases of the two transistors 113 and 114 are positive, and those transistors can conduct. Because the signal on the electrode 114b of transistor 114 is negative, current will flow through the transistors 113 and 114 in a direction to provide a negative output error signal across the load resistor 115. During the second half of the cycle, the bases of the transistors 111 and 112 are positive, while the bases of the transistors 113 and 114 are negative. Thus, the transistors 111 and 112 are conductive, while the transistors 113 and 114 are cut off. Because the signal appearing on the electrode 111b of transistor 111 is negative, current will flow through the transistors 111 and 112 in a direction again to provide a negative output signal across the resistor 115.

Assume now the opposite phase relationship, where the upper ends of the secondary windings 119b and 110c are positive, but the input signal on the electrode 111b of transistor 111 is negative, while the input signal on the electrode 114b of transistor 114 is positive. In this case, the bases of the transistors 111 and 112 are negative, while the bases of the transistors 113 and 114 are positive. Thus, the transistors 111 and 112 are cut off, while the transistors 113 and 114 are conductive. Because the signal on the electrode 114b of the transistor 114 is positive, current flows through the transistors 113 and 114 in such a direction as to provide a positive output signal across the load resistor 115. During the second half of the cycle, when the polarities are all reversed, the bases of the transistors 111 and 112 are positive, while the bases of the transistors 113 and 114 are negative, thus allowing conduction through the transistors 111 and 112 while the transistors 113 and 114 are cut off. Again, because the signal on the electrode 111b of the transistor 111 is positive, current flows through the transistors 111 and 112 in such a direction as to produce a positive error signal across the load resistor 115. In this manner, an output signal is produced across the resistor 115, which is either positive or negative, depending upon the phase relationship between the output signals from the amplifiers 64 and 66 and the reference signal provided from the remainder of the circuitry shown in FIG. 9. It is understood that identical transistor demodulator circuitry is provided for both the -a–a' and -b–b' error signal channels.

It was previously mentioned with reference to the block diagram of FIGS. 4a and 4b that each channel is provided with two trigger circuits 70 and 71, which operate to convert the approximate sine wave signal received from the low-pass amplifier 62 into a square wave output signal when the input sine wave amplitude exceeds one or both of two predetermined amplitude levels. The output signals from the trigger circuits are utilized to control the IN and OUT motor drive circuitry. The actual circuitry corresponding to the trigger circuits 70 and 71 is illustrated in FIG. 10. It is apparent from the block diagram previously considered that there are four small signal Schmitt trigger circuits 70 and four large signal Schmitt trigger circuits 71. Because all combinations of one small signal Schmitt trigger circuit and one large signal Schmitt trigger circuit are identical in all four signal channels, only one will be described in detail.

As seen in FIG. 10, the input signal from the low-pass amplifier 62 appears across a resistor 116 which is common to the base circuits of both the small signal Schmitt trigger circuit 70 and the large signal Scmitt trigger circuit 71. Looking first at the large signal Schmitt trigger circuit 71, it is seen that it comprises a pair of NPN transistors 117 and 118, which have their emitters connected together through a diode and thence to ground through a variable resistor 120 and a small fixed resistor 121, with the resistor 121 having a source 122 of positive potential connected thereacross. The collector electrode of the transistor 117 is connected directly to the base of the transistor 118 and also to a source of positive voltage through a 100K resistor; the collector of the transistor 118 is connected to a source of positive voltage through a 10K resistor and also provides the output signal from the circuit on a conductor 119.

In operation, with no input signal from the amplifier 62, the base of the transistor 117 is approximately at ground potential, and its emitter is somewhat more positive due to the voltage source 122, thus maintaining the transistor 117 in a cutoff condition. When the transistor 117 is cut off, the base of the transistor 118 is sufficiently positive that that transistor conducts heavily. This, in turn, causes a voltage drop across the resistor 120, which maintains the emitter of the transistor 117 quite positive with respect to the base of the transistor and the transistor 117 remains cut off. However, when the positive portion of an alternating signal received from the amplifier 62 is large enough to raise the potential of the base of the transistor 117 to a sufficient extent to start conduction through that transistor, then as transistor 117 conducts, the potential at its collector elecrode drops, thus lowering the potential of the base of the transistor 118 and decreasing its conduction. The effect just described is regenerative and very quickly a positive signal appears on the collector of the transistor 118 as that transistor is cut off. The collector of the transistor 118 remains positive until the amplitude of the input signal appearing across the resistor 116 drops to a level where the regenerative effect reverses, and the transistor 117 is again cut off. Thus, an output signal is obtained at the collector of the transistor 118 which varies from approximately +20 volts, when there is a positive input signal, to approximately +6 volts when there is no positive input signal. The amplitude of the input signal required to trigger the large signal Schmitt circuit 71 may be adjusted by means of the variable resistor 120 in the common emitter circuit of the two transistors 117 and 118. As noted before, in normal operation the resistor 120 would be so adjusted that the circuit would be triggered when the amplitude of the input signal corresponds to slightly more than half of the maximum output of the corresponding detector.

The small signal Schmitt trigger circuit 70 is similar to the large signal Schmitt trigger circuit 71 and comprises a pair of NPN transistors 123 and 124, having their emitters connected together through a diode and to ground through the resistor 121, which is also common to the emitter circuit of the large signal Schmitt trigger. The small Schmitt trigger circuit 70 differs from the large Schmitt trigger circuit 71 in that the common emitter resistor 121 is much smaller, and in that the output signal is not taken directly from the collector of the transistor 124, but is taken from between two resistors 125 and 126 in the collector circuit.

In operation, as in the case of the large Schmitt circuit 71, the transistor 123 is cut off, in the absence of a positive input signal, because of the low positive potential at its base and the higher positive potential on its emitter. Thus, at that time, the potential at the point 127 between the resistors 125 and 127 is approximately +18 volts. However, when a large enough positive signal is received and the transistor 123 is caused to conduct and the transistor 124 to be cut off, the potential at the point 127 will increase slightly to approximately +20 volts. The point at which the transistor 123 is caused to conduct is determined by the size of the voltage source 122 placed across the resistor. In practice, these values are so selected that the transistor 123 conducts when slightly less than half of the maximum signal is received from the corresponding detector in the channel.

The small Schmitt trigger 70 operates in conjunction with two output stages to provide two identical output signals, one on a conductor 139 for one of the AND gates 80 or 81 and one on a conductor 149 for the OR gate 77, previously described with reference to FIG. 4b. Two output stages are required because one operates in conjunction with an input signal from a sun shutter amplifier to provide an output signal if the sun shutter is actuated. The two output stages are driven by a stage comprising a PNP transistor 130 having its base connected directly to the point 127 in the collector circuit of the transistor 124 and having two parallel collector circuits. One collector circuit comprises two resistors 131 and 132 and the other comprises two similar resistors 133 and 134. As the signal at the point 127 varies from approximately +18 volts to +20 volts in response to triggering of the small Schmitt trigger 70, the transistor 130 changes from a conductive to a nonconductive state. When the transistor 130 is in a nonconducting state, a point 135 at the juncture of the resistors 131 and 132 is essentially at zero potential. Similarly, a point 136 at the juncture of the resistors 133 and 134 is also at zero potential. When the transistor 130 conducts, however, the potential at the points 135 and 136 rises to approximately +2 volts.

One of the output stages comprises an NPN transistor 137 having its base connected to the point 135, its emitter grounded, and its collector connected to a source of positive potential through a resistor 138. The transistor 137 acts as a switch in that when the transistor 130 is nonconducting, the potential on the base of the transistor 137 is approximately zero volts and the transistor 137 is cut off, thus making the potential at its collector approximately +20 volts. When the transistor 130 is conducting, the potential at the base of the transistor 137 rises a sufficient amount to turn on that transistor and the potential at its collector drops to approximately +1 volt. As will be seen later, the transistor 137 acts as a switch to control the input to the AND gates 80 or 81, depending on which channel it is in.

The second output of the small Schmitt trigger circuit 70 is obtained from the collectors of a pair of NPN transistors 140 and 141 which are connected in parallel. The emitters of the transistors 140 and 141 are connected together and to ground, while the base of the transistor 140 is connected to the point 136 and the base of the transistor 141 is connected to ground through a resistor 142. When the transistor 130 is in a non-conducting state, the potential at the point 136 and on the base of the transistor 140 is substantially zero, and the transistor 140 is cut off, thus making the potential at its collector approximately +20 volts. When the transistor 130 conducts, the potential at the point 136 rises a sufficient amount to turn on the transistor 140 and the potential at its collector drops to approximately +1 volt. Thus, as in the case of the transistor 137, the transistor 140 acts as a switch.

The transistor 141 connected in parallel with the transistor 140 provides an OR gate, whereby, if a positive signal is received from the sun shutter amplifier 49 (FIG. 3), the base of the transistor 141 becomes positive, which causes that transistor to conduct and causes the potential at its collector to become essentially zero. Thus, it is seen that the input to the OR gate 77 is shorted to ground through the transistor 140 if there is a positive input signal of sufficient amplitude to the small Schmitt trigger circuit 70, or through the transistor 141 if there is a positive input signal to the transistor 141 due to actuation of the sun shutter in front of detector of that channel.

The sun shutter amplifier 49 that provides a signal across the resistor 142 may be of conventional design to produce a positive output signal of several volts in response to an output of predetermined magnitude from the sun detector 50 (FIG. 3), and to energize the solenoid 51.

Figure 11:
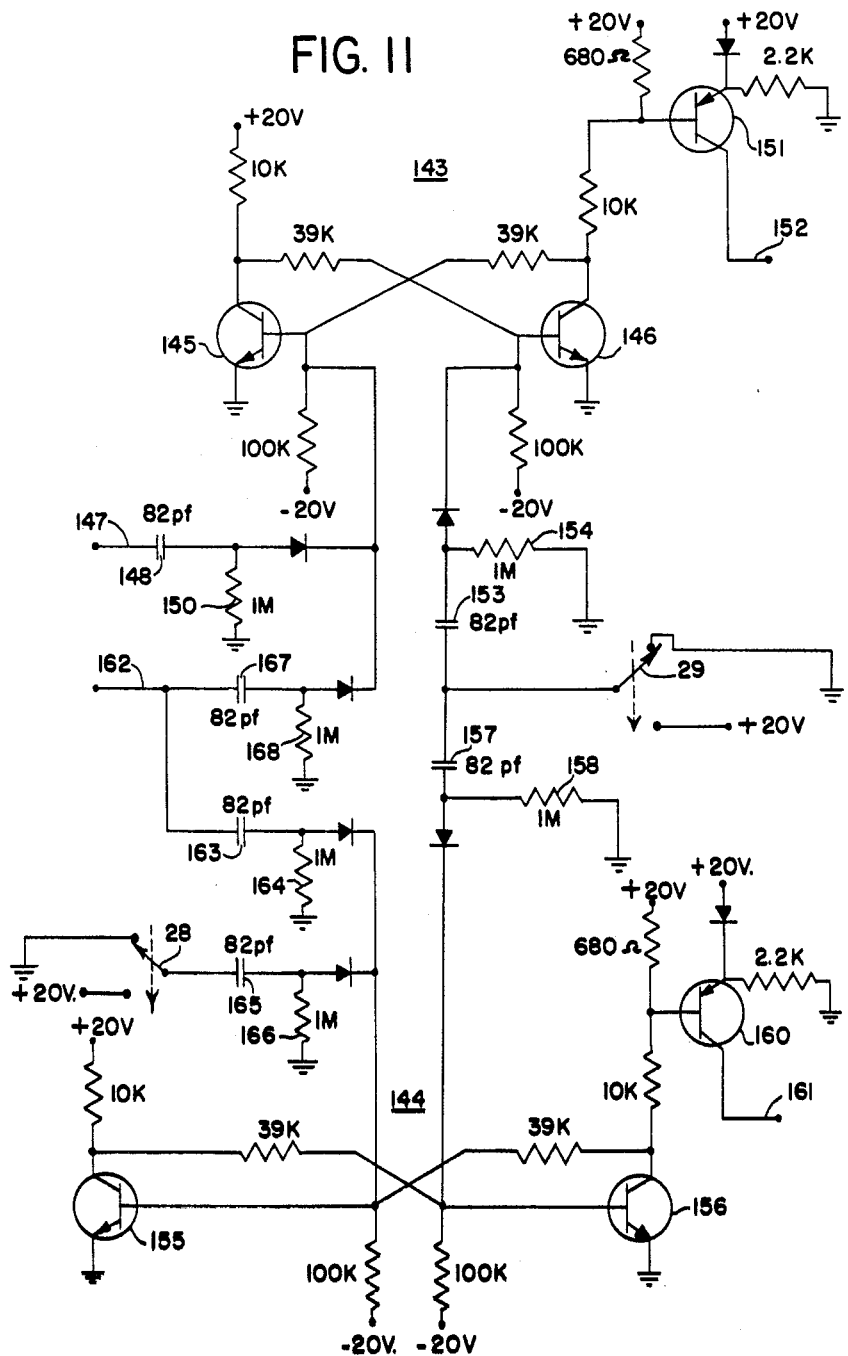
FIG. 11 is a diagram of a circuit for commanding pivotal movement of the reflectors to acquire a target initially.

The acquisition circuit 76 described in connection with FIG. 4b is shown in detail in FIG. 11. It will be remembered that this circuit serves to initiate motion to decrease the angle of view between detectors of the pairs (hereafter referred to as IN motion) in response to an acquisition pulse received from an external source, to reverse the direction of motion if the IN limit switch 29 is actuated, to increase the angle of view (hereafter referred to as OUT motion) and to stop the OUT motion if a target is acquired or if the OUT limit switch 28 is actuated. The acquisition circuit shown in FIG. 11 comprises two conventional bi-stable multivibrators 143 and 144. The multivibrator 143, which serves to control the IN motion of the pivotal mirrors, comprises transistors 145 and 146 and their conventional biasing and feed-back circuitry. When a positive acquisition pulse is received from an external source on a conductor 147, it is differentiated by a capacitor 148 and resistor 150 and appears on the base of the transistor 145 to turn on that transistor. When the transistor 145 conducts, it decreases the potential at the base of the transistor 146 and that transistor is turned off. The condition of the transistor 146 controls conduction through an output transistor 151, whose base is connected into the voltage divider in the collector circuit of the transistor 146. When the transistor 146 is turned off, the potential at the base of the transistor 151 is sufficiently positive to prevent conduction through the transistor 151, which causes a lead 152 connected to the collector of the transistor 151 to be floating at essentially zero potential.

If, during inward travel of the pivotal mirrors, a target is not acquired and the IN limit switch 29 is actuated, a differentiating circuit comprising a capacitor 153 and a resistor 154 is connected through the switch 29 across +20 volts and causes a positive pulse to appear on the base of the transistor 146. This pulse causes the transistor 146 to be turned on and the transistor 145 to be turned off. When the transistor 146 conducts, the potential on the base of the output transistor 151 decreases by a sufficient amount to cause conduction of that transistor. Thus, the lead 152 is connected through the conducting transistor 151 to a source of +20 volts, which in turn disables the circuitry that causes the inward motion of the mirrors.

The OUT motion multivibrator 144 is identical to the IN motion multivibrator 143, and comprises transistors 155 and 156. As just described, if the IN limit switch 29 is actuated, it disables the IN motion circuitry by turning on the transistor 151. When that switch is closed, a positive pulse is also provided by the differentiating action of a capacitor 157 and a resistor 158, which appears on the base of the transistor 156; this raises the potential of the base of the transistor a sufficient amount to cause it to conduct. Conduction of the transistor 156 causes the potential on the base of an output transistor 160 to be such as to turn on that transistor. Therefore, a lead 161 connected to the collector of the transistor 160 is at a potential of approximately +20 volts. That potential causes the OUT motor circuitry to be actuated to increase the angle of view between the detectors.

Similarly, if a positive signal is received on a lead 162 indicating acquisition of a target, or if a positive signal is produced by actuation of the OUT limit switch 28, the transistor 155 is caused to turn on and the transistor 156 to turn off. A positive signal, appearing on the lead 162 as a result of acquisition of a target, is differentiated by a capacitor 163 and a resistor 164 and appears on the base of the transistor 155. Similarly, a positive pulse caused by closing of the OUT limit switch 28 is differentiated by a capacitor 165 and a resistor 166 and appears on the base of the transistor 155. In either case, the positive pulse on the base of the transistor 155 causes that transistor to be turned on, which causes the transistor 156 to be turned off. When the transistor 156 is turned off, the potential at the base of the output transistor 160 is such as to turn off that transistor. Thus, the lead 161 connected to the collector of the transistor 160 is left floating. This causes the OUT motion control circuitry to be disabled.

It is pointed out that if a positive signal is received on the lead 162 in response to acquisition of a target, it is also differentiated by a capacitor 167 and a resistor 168 and appears on the base of the transistor 145 in the IN motion multivibrator 143. This causes the transistor 145 to conduct and the transistor 146 to be cut off, which causes the output transistor 151 in that circuitry to be cut off. This would then permit IN motion of the mirrors. As will be later made clear, this IN movement is not permitted because of another portion of the circuitry, but the IN motion multivibrator 143 is in condition for such motion if permitted.

Attention is drawn to the fact that in the circuitry described prior to the acquisition circuit, the various signals utilized have been alternating, generally between +20 volts and zero at a frequency of 30 cps, due to the action of the chopper. In the acquisition circuit, however, because of the bi-stable multivibrators 143 and 144, the output signals to the IN and OUT motion drive circuitry are steady state rather than alternating.

It is important to remember, for a thorough understanding of the remainder of the motor control circuitry, that the control signals appearing on the leads 152 and 161 are opposite in their control function. Specifically, the absence of a signal on the lead 152 (lead 152 floating) indicates that the motor control circuit should drive the mirrors IN, while the presence of a signal on that lead (lead at +20 volts), indicates that the inward motion should stop. On the other hand, the presence of a signal on the lead 161 (lead at +20 volts) indicates that the motor should drive the mirrors outwardly, while the absence of a signal on that lead (lead floating) indicates that there should be no outward motion.

Figure 12B:
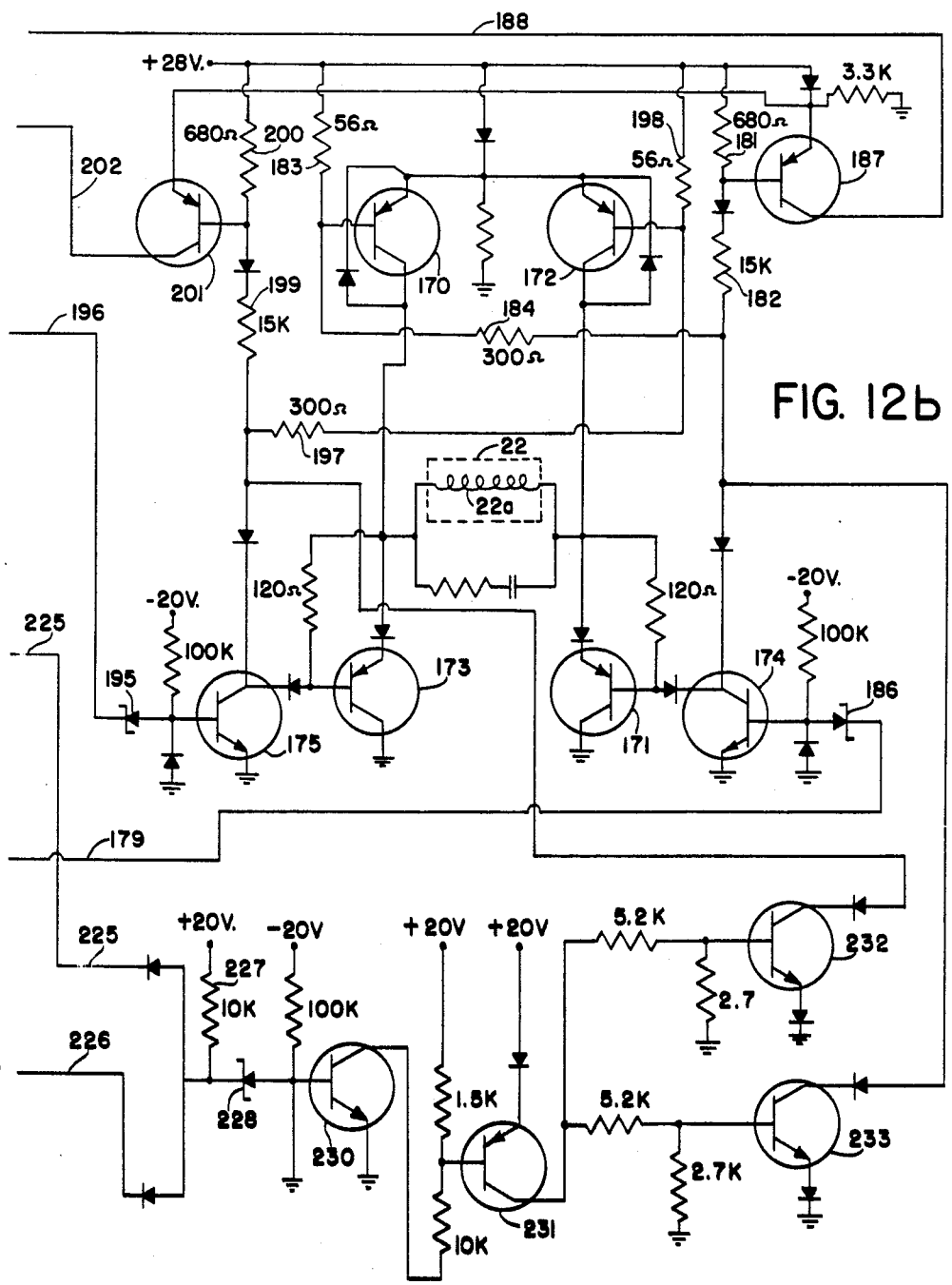

Let us consider now the remainder of the motor control circuitry for causing the mirrows to pivot to increase or decrease the angle of view of the detectors. This circuitry is shown in FIGS. 12a and 12b. The servo drive mirror 22 which causes the mirrors to pivot is shown approximately in the center of FIG. 12b. The motor 22 is of the type which rotates in either direction depending upon the direction of current flow through its control winding 22a. The direction in which current flows through that control winding is in turn under the control of two pairs of transistors, one pair comprising PNP type transistors 170 and 171 and the other pair comprising PNP transistors 172 and 173. The condition of the transistor 171 controls the condition of the transistor 170, and the condition of the transistor 173 controls the condition of the transistor 172. In turn, the condition of the transistor 171 is determined by the condition of an NPN transistor 174, and the condition of the transistor 173 is determined by the condition of another NPN transistor 175. If the transistors 170 and 171 are both in a conducting state, current flows from a +28 volt supply line through the transistor 170, the motor winding 22a, and transistor 171 to ground. Similarly, if the transistors 172 and 173 are both in a conducting state, current flows from the +28 volt supply through the transistor 172, the motor control winding 22a, and transistor 173 to ground. Thus, it is seen that depending on which of the pairs of transistors is in a conducting state, current flows through the motor control winding 22a in one direction or the other. The condition of the transistor 171 is controlled by the condition of the transistor 174 which, in turn, responds to OUT motion control commands derived from the acquisition circuit 76 and from the AND gates 80 and 81 (FIG. 4b). Similarly, the condition of the transistor 173 is controlled by the condition of the transistor 175 which, in turn, is controlled by IN motion commands derived from the acquisition circuit 76 and from the OR gate 77 (FIG. 4b).

The following description of the circuitry shown in FIGS. 12a and 12b will be better understood if it is borne in mind that the various transistors comprising the circuitry operate in binary fashion; that is, the transistors are either heavily conducting or completely nonconducting. In many cases, the collector of a transistor is connected to the base of a following transistor through a Zener diode. When the first transistor is conducting, the diode does not break down and the base of the following transistor is biased negatively to keep that transistor cut off. When the first transistor is nonconducting, the Zener diode breaks down to bias the base of the following transistor positively, so that transistor then conducts. In several cases, this usage of transistors is repeated serially through as many as four transistors.

Looking first at the OUT motion control circuitry shown in the lower portion of FIG. 12a, it is seen that the condition of the transistor 174 (FIG. 12b) is determined by the condition of an NPN transistor 176 (FIG. 12a) to which it is connected by a conductor 179. In turn, the condition of the transistor 176 is determined by the condition of another NPN transistor 177. With no signal coming in to the base of the transistor 177, its base is maintained at a slight negative potential because of the forward resistance drop of a diode 178 in its base circuit and the transistor is nonconducting. When the transistor 177 is nonconducting, its collector is at approximately +20 volts, which causes a Zener diode 180 in its collector circuit to break down, thus putting a positive potential on the base of the transistor 176. The positive potential on the base of the transistor 176 causes that transistor to conduct, which drops its collector potential substantially to zero. Thus, a Zener diode 186 connected between the collector of the transistor 176 and the base of the transistor 174 does not break down, which maintains the base of the transistor 174 at a slightly negative potential because of a diode connected in that circuit. The transistor 174 is therefore nonconducting and its collector is at approximately +28 volts, to which voltage it is connected through two voltage dividers, one comprising resistors 181 and 182 and the other comprising resistors 183 and 184. The base of the transistor 170 is connected to the juncture of resistors 183 and 184 and hence when the transistor 174 is cut off, the base of the transistor 170 is at +28 volts and that transistor is nonconducting. When the transistor 174 is nonconducting, it also maintains the transistor 171 in a nonconducting state.

If, however, a +20 volt OUT motion control signal appears on the lead 161 from the acquisition circuit, the base of the transistor 177 is raised to a positive potential and that transistor conducts. When the transistor 177 conducts, the potential at its collector is essentially zero and the Zener diode 180 does not break down. Thus, when the Zener diode 180 does not break down, the base of the transistor 176 is maintained at a slight negative potential because of the forward resistance drop of a diode in its base circuit and, hence, transistor 176 does not conduct. When the transistor 176 is nonconducting, its collector is at approximately +20 volts, which causes the Zener diode 186 in the base circuit of the transistor 174 to break down. When the diode 186 breaks down, the base potential of the transistor 174 becomes positive, thus turning on that transistor. When the transistor 174 conducts, the base of the transistor 170 becomes less positive than when the transistor 174 is nonconducting because of current flowing through the resistors 183 and 184, and the transistor 174 conducts. When the transistor 174 conducts it also turns on transistor 171, so that current flows from the +28 volt supply through the transistor 170, the motor control coil 22a, and the transistor 171 to ground. Thus, the motor is driven in a direction to cause an outward motion of the pivotal mirrors.

It is also pointed out that when the transistor 174 conducts, the juncture of the voltage divider resistors 181 and 182 becomes less positive than when the transistor 174 is cut off. The juncture of the resistors 181 and 182 is connected to the base of a PNP transistor 187, whose collector is connected into the IN motion control circuitry. When the transistor 187 conducts, it provides a potential of approximately +28 volts to the IN motion control circuitry by means of a conductor 188, which inhibits action of that circuitry. Therefore, when the OUT motion control circuitry is energized, the IN motion control circuit cannot be energized.

Let us now look at the IN motion control circuitry, bearing in mind that if there is no signal from the acquisition circuitry, the IN motion circuit will be activated, while if there is a +20 volt signal from the acquisition circuit, the IN motion circuitry will not be activated. First consider the case where there is a +20 volt signal provided on the conductor 152 (seen in the upper center of FIG. 12a) from the acquisition circuitry previously considered. Such a signal will cause the base of an NPN transistor 190 which is otherwise slightly negative, to become positive, thus causing the transistor to conduct. When the transistor 190 conducts, its collector is at substantially zero potential, thus preventing the breakdown of a Zener diode 191 in the collector circuit and maintaining the base of an NPN transistor 192 at a slight negative potential because of the forward drop of a diode connected in its base circuit. When the transistor 192 is nonconducting, its collector potential is approximately +20 volts, which causes a Zener diode 193 in its collector circuit to break down, thus placing a positive potential on the base of an NPN transistor 194 to cause it to conduct. When the transistor 194 conducts, its collector, which is connected to a Zener diode 195 by a conductor 196, is at substantially zero potential. This prevents the breakdown of the Zener diode 195 (FIG. 12b), which in turn maintains the transistor 175 in a cutoff condition because of the slight negative bias on its base due to the diode in that circuit. The transistor 175, being cut off, maintains the transistor 173 nonconducting.

The collector of the transistor 175 is connected to the +28 volt supply through two voltage dividers, one comprising two resistors 197 and 198, and the other comprising two resistors 199 and 200. The base of the transistor 172 is connected to the juncture of the resistors 197 and 198 so that, when the transistor 175 is nonconducting, the base of the transistor 172 is at +28 volts and the transistor is cut off. Thus, there is no current flow from the +28 volt supply through the transistor 172, the motor control winding 22a, and the transistor 173 to ground.

If, however, there is no signal present on the conductor 152 from the acquisition circuitry, the transistor 190 is maintained in a nonconducting condition because of the diode in its base circuit, which causes its collector to be at approximately +20 volts. The high collector voltage of the transistor 190 causes the Zener diode 191 to break down, thus placing a positive potential on the base of the transistor 192. The transistor 192 conducts, which places its collector potential at approximately zero volts. This, in turn, prevents the breakdown of the Zener diode 193 and the transistor 194 is maintained in a cutoff position because of the slight negative base bias provided by the diode in its base circuit. When the transistor 194 is cut off, its collector potential is at approximately +20 volts, which causes the Zener diode 195 in the base circuit of the transistor 175 to break down, thus making that transistor conductive. When the transistor 175 conducts, the positive potential on the base of the transistor 172 decreases because of current flow through the resistors 197 and 198 and that transistor conducts. When the transistor 175 conducts, it also turns on the transistor 173 so that current flows from the +28 volt supply through the transistor 172, the motor control winding 22a, and the transistor 173 to ground.

As the transistor 175 conducts, it reduces the positive voltage on the base of a transistor 201, which is connected to the juncture of resistors 199 and 200, thus causing it to conduct. When the transistor 201 conducts, its collector is at approximately +28 volts, which appears on a conductor 202 that is connected through a 12K resistor into the base circuit of the transistor 176 in the OUT motion control circuitry. This signal serves to turn on the transistor 176, thus disabling the OUT motion control circuitry. This signal serves to turn on the transistor 176, thus disabling the OUT motion control circuitry while the IN motion control circuitry is energized.

It will be recalled that when the OUT motion control circuitry is energized, a +28 volt signal appears on the conductor 188 which is connected through a 12K resistor to the base of the transistor 194. When this signal is present, the transistor 194 is caused to conduct, thereby preventing the breakdown of the Zener diode 195 in the base circuit of the transistor 175. Thus, when the OUT motion control circuitry is energized, the IN motion control circuitry is de-energized.

It was previously mentioned that if a target is acquired that is of sufficient magnitude to fire any one of the small Schmitt trigger circuits 70 (FIG. 10), the pivotal movement of the mirrors is immediately stopped. If the target is acquired during inward movement of the mirrors, the circuitry shown in the upper left corner of FIG. 12a operates to stop the inward motion. As mentioned in connection with FIGS. 4a and 4b, the output conductor 149 of each of the small Schmitt trigger circuits 70 is connected to an OR gate 77. FIG. 12a shows the OR gate 77 comprising four Zener diodes 205a, 205a', 205b, 205b', which are connected between the output leads 149a, 149a', 149b, 149b', of the small Schmitt trigger circuits and the juncture between a 100K resistor and the base of an NPN transistor 206. The other end of the resistor is connected to −20 volts, and the transistor base is connected to ground through a biasing diode 207. It will be recalled that if there is no input signal to the small Schmitt trigger circuit 70, the output transistor 140 is conducting and its output lead 149 is essentially at ground potential (FIG. 10). This means that there is insufficient potential difference across any one of the Zener diodes 205 to cause it to break down, and the base of the transistor 206 is slightly negative due to the potential drop across the diode 207 in its base circuit. Therefore, the transistor 206 is cut off. A PNP type transistor 208 has its base connected into a voltage divider which, in turn, is connected between the +20 volt supply and the collector of the transistor 206. Therefore, when the transistor 206 is cut off, the base of the transistor 208 is sufficiently positive to prevent conduction through that transistor and it, too, is cut off.

Following the transistor 208 is a Schmitt trigger circuit 78 comprising two NPN transistors 210 and 211, with the base of the transistor 210 being connected to a voltage divider in the collector circuit of the transistor 208 and also being connected to the +20 volt supply through a capacitor 212. In the absence of an input signal and with the transistor 208 cut off, the Schmitt trigger transistor 210 is also cut off, because its emitter is positive with respect to its base. The transistor 211 is turned on, so that its collector is essentially at zero potential, which means that a Zener diode 214 connected between the collector of the transistor 211 and the base of the transistor 190 does not break down. Hence, the transistor 190 is maintained in a nonconductive condition, which, it will be recalled, results in the condition of the transistor 194 that causes the motor control circuitry to drive the mirrors inwardly.

In the event that a target is acquired, and one of the small Schmitt triggers 70 is fired by the positive portion of the alternating signal, the voltage at its output lead 149 will rise to approximately +20 volts. This causes the corresponding one of the Zener diodes 205 to break down, thus raising the potential at the base of the transistor 206 and causing that transistor to conduct. When the transistor 206 conducts, the voltage divider in its collector circuit, to which the base of the transistor 208 is connected, causes the base of the transistor 208 to drop in potential, thus also turning on that transistor. When the transistor 208 conducts, a positive voltage appears on the base of the transistor 210, thus turning it on, and turning the transistor 211 off. When the transistor 211 is cut off, its collector voltage rises, and the Zener diode 214 breaks down, thus turning on the transistor 190. As previously described, that is the condition which results in the transistor 194 being turned on, which in turn de-energizes the IN motion motor control circuit.

Because of the action of the chopper in the sensing head, acquisiton of a target results in an alternating signal being provided from the small Schmitt trigger 70, with the signal alternating between approximiately +20 volts and zero volts. In order to drive the D.C. motor control circuits, this alternating signal must be converted to a direct current signal, which is the function of the Schmitt trigger transistors 210 and 211 and a filter comprising the capacitor 212 and the resistor 213 in the base circuit of the transistor 210. During the time that the input signal is a its +20 level, the transistor 208 is conductive and provides a positive voltage or approximately +20 volts at the base of the transistor 210. This means that the capacitor 212 has approximately +20 volts on each side. When the transistor 208 cuts off again, the capacitor 212 must charge again through the resistor 213 and its charging time is such that the transistor 212 is maintained conductive during that portion of the cycle when the input signal is at zero potential and the transistor 208 is cut off. Thus, by the simple expedient of utilizing a filter in the input circuit to a Schmitt trigger circuit, an alternating current signal is converted to a direct current signal.

I will be recalled that, in the description of the acquisition circuit (FIG. 11), it was mentioned that if a target is acquired during outward movement of the mirrors, a positive signal will be received on the conductor 162 which will cause outward travel of the mirrors to be stopped and inward travel permitted. That signal is obtained from the collector circuit of the transistor 208 and appears on the conductor 162, when the transistor 208 is turned on in response to an input signal from any one of the small Schmitt trigger circuits 70. It is pointed out that, although the acquisition circuit provides no signal on the conductor 152 in the base circuit of the transistor 190, which would normally permit inward motion of the mirrors, the signal provided from the Schmitt trigger transistor 211 inhibits such movement. Thus, although the IN motion motor control circuitry is in condition to be energized, it is prevented by the signal passing through the OR gate 77.

It was mentioned in connection with the description of the block diagram of FIGS. 4a and 4b that there are three occasions after a target has been acquired when it is desirable to cause the angle of view of the detectors to be increased. The required conditions for causing the angle of view to be increased are that the output signals of the detectors be sufficiently large to cause output signals from the large Schmitt trigger circuits 71a and 71a' and from the small Schmitt trigger circuits 70b and 70b', or output signals from the small Schmitt trigger circuits 70a and 70a' and from the large Schmitt trigger circuits 71b and 71b', or output signals from all four of the large Schmitt trigger circuits 71. The control circuitry for responding to these conditions is shown in the lower left portion of FIG. 12a.

The circuitry for responding to the three conditions comprises two AND gates 80 and 81 and an OR gate 82. The AND circuit 80 comprises four conventional diodes providing parallel input from the outputs of two large and two small Schmitt trigger circuits on the leads 119a, 119a', 139b, 139b'. The output from each of the Schmitt trigger circuits is connected to one end of the diode, and the other end of each diode is connected to the bottom of a 10K resistor 215 whose upper end is connected to +20 volts. Also connected to the bottom of the 10K resistor is a Zener diode 216, whose other side is connected through a 100K resistor 217 to −20 volts. The lower end of the resistor 217 is also connected to ground through a conventional diode and to the base of an NPN transistor 218. If the Schmitt trigger circuits are not activated, current flows from the +20 volt supply through the resistor 215 and through any one or all of the output transistors in the Schmitt trigger circuits to ground. Also, current flows through the resistor 217 from ground to the −20 volt supply. Thus, the voltage on both sides of the Zener diode 216 is approximately zero volts and the diode does not break down. If, however, there is an output signal from all four of the Schmitt trigger circuits connected into the AND gate 80, current no longer flows through the resistor 215 to ground, and approximately 20 volts is placed on the left side of the Zener diode. This causes the diode to break down, thus putting the base of the transistor 218 at a positive potential, which causes that transistor to conduct.

The A.C.-D.C. converter circuit 83 functions in the same manner as the converter circuit 78 previously described. When, due to a signal passing through the AND gate 80, the transistor 218 is caused to conduct, it also turns on the transistor 220, which discharges a capacitor 223. A Schmitt trigger circuit comprising two NPN transistors 221 and 222 is controlled by the transistor 220 and, when the transistor 220 is caused to conduct, the transistor 221 is turned on, which in turn cuts off the transistor 222. When the transistor 222 is cut off, the transistor 177 is turned on. This results in the transistor 176 being turned off, which, it will be recalled, is the condition to cause the OUT motor control circuitry to be energized and for the angle of view between the detectors to be increased. The charging time of the capacitor 223 through a resistor 224 is sufficiently long to keep the transistor 221 turned on through a complete alternating signal cycle.

Similarly, if the two small Schmitt trigger circuits 70a, 70a' having output leads 139a, 139a', respectively, and the two large Schmitt trigger circuits 71b, 71b', having output leads 119b, 119b', respectively, are all energized, a signal will pass through the AND gate 81 and through the OR gate 82, to cause operation of the A.C.-D.C. converter 83 in the manner just described. Thus again, the OUT motor control circuitry will be energized to increase the angle of view between the detectors of each pair.

If all four of the large Schmitt trigger circuits 71 are energized, it also means that all four of the small Schmitt trigger circuits 70 are energized. Therefore, this condition corresponds to that in which signals pass through both of the AND gates 80 and 81, through the OR gate 82 and hence into the A.C.-D.C. converter 83. The effect of this, of course, will be again to energize the OUT motor control circuitry to increase the angle of view between the detectors.

It has been previously mentioned that means are provided to stop positively the motor drive when there is no IN motion or OUT motion command signal. The braking circuitry is shown in the lower portion of FIG. 12b. It is actuated by a signal appearing on a lead 225 from the transistor 192 in the IN motion control circuitry, or by a signal appearing on a lead 226 from the transistor 177 in the OUT motion motor control circuitry. When the IN motor control circuitry is energized, the transistor 194 is nonconducting, which, it will be recalled, is caused by the transistor 192 conducting. When the transistor 192 conducts, current flows from the +20 volt supply through a resistor 227 in the input circuit to the motor stopping circuitry and through the transistor 192 to ground. This means that the bottom of the resistor 227 is at essentially zero potential, so that a Zener diode 228 in the base circuit of a normally nonconducting NPN transistor 230 does not break down. This is also true if the transistor 177 in the OUT motion control circuitry is conducting, which indicates that the OUT motion drive circuitry is energized. If, however, both transistors 192 and 177 are non-conducting, approximately +20 volts appears across the Zener diode 228, which causes it to break down. This, in turn, raises the potential of the base of the transistor 230 and causes it to conduct. When the transistor 230 conducts, it raises the potential of the base of a transistor 231 connected into its collector circuit, and that transistor also conducts. When the transistor 231 conducts, it raises the base potential of each of two transistors 232 and 233, which are connected in parallel with the transistors 173 and 174, respectively, in the IN and OUT motion motor control circuitry. Thus, when the transistors 232 and 233 are turned on, it causes both of the transistors 170 and 172 in the motor energizing circuitry to be turned on, which, in effect, places a short circuit across the motor control coil 22a.

To summarize the description of the apparatus of the invention, the logic diagram of FIGS. 4a and 4b will be briefly reviewed with reference to the detailed circuitry shown in other figures. Each of the signals provided from the detectors in the sensing head is amplified by a conventional preamplifier 60, passed through a low-pass filter 61, and further amplified in a low-pass amplifier 62 (FIG. 6). The output signals from the low-pass amplifiers 62 serve two purposes. First, the signal from one of the channels of each pair is inverted by a unity-gain amplifier (FIG. 7) and added to the signal from the other channel by a summing amplifier 64 (FIG. 8) to provide an output signal whose phase and magnitude are dependent on the direction and magnitude in two rectangularly related coordinate planes, of the angular difference between the line of sight from the sensing head to a target and the reference axis through the sensing head.

Second, each of the signals from the low-pass amplifiers 62 is also provided to a large signal Schmitt trigger circuit 71 and a small signal Schmitt trigger circuit 70 (both shown in FIG. 10). The output signals from these Schmitt trigger circuits are utilized to cause the mirrors to move outwardly to increase the angle of view between the two detectors of each pair until the signals obtained from the detectors fall below certain predetermined levels. This is accomplished by means of two AND gates 80 and 81 and an OR gate 82 (FIG. 12a). It is pointed out again that the reason for providing this control is because of the ellipticity of the majority of the targets that the apparatus would be used to detect. However, if the target is perfectly circular, the operation of the apparatus will not be adversely affected.

As shown in FIG. 12b OUT motion control circuitry 74 and IN motion control circuitry 75 are provided, which respond both to IN and OUT command signals from the acquisition circuit 76 (FIG. 9), STOP signals from the OR gate 77, and OUT motion drive signals from the AND gates 80 and 81. In addition, if there is no IN drive signal or OUT drive signal, a short circuit is placed across the control coil of the mirror servo motor 22 to stop it positively (FIG. 12b).

It is now apparent that the apparatus of the invention fulfills the objectives set forth. Its angle of view is adjustable from approximately 180° to less than 1°; it is fully transistorized and is, therefore, compact, lightweight, and reliable. Power is provided to the moving mechanism only when there is an error between the line of sight of the apparatus and the predetermined reference axis so that no more power is expended than is absolutely necessary. If desired, means may be provided in conjunction with the traveling nut assembly in the sensing head to measure the angle between the two mirrors of each pair or to measure the change in angle between those mirrors. Thus, the apparatus can be adapted to act as an altimeter or as a rate-of-change-of-altitude sensor.

It is apparent that the detailed circuitry illustrated and described is merely representative of circuitry that might be used. Many modifications will occur to one skilled in the art which will fall within the true scope and spirit of the invention.

We claim:

1. In a radiant energy detecting apparatus, a sensing head for generating signals indicative of the dynamic relationship, in each of two rectangularly related coordinate planes, of the line of sight between said head and a target, to a predetermined reference axis through said head, comprising:

a first pair of reflectors on opposite sides of said reference axis for reflecting energy emanating from said target, a second pair of reflectors on opposite sides of said reference axis for reflecting energy emanating from said target, means for mounting said four reflectors in quadrature about said axis for pivotal movement about axes lying in a plane normal to said reference axis, a pair of detector units mounted on said sensing head for receiving energy emanating from said target and reflected from each pair of said reflectors, each of said reflectors being effective to generate a signal in response to said received energy, the pivotal position of each pair of said reflectors being effective to define an angle of view between the respective pairs of detectors, means for simultaneously and in synchronism pivoting the two reflectors of each said pair so that signals produced by said two pairs of detectors in response to energy reflected from corresponding pairs of reflectors are indicative of the relationship between said line of sight of said head and said reference axis in said two rectangularly related coordinate planes, and programming means responsive to said signals having a selected value for interrupting operation of said pivoting means to maintain said target in said angle of view between at least one pair of said detectors.

2. A sensing head as defined in claim 1, wherein each reflector is a mirror.

3. A sensing head as defined in claim 1, wherein each reflector is a plane mirror.

4. A sensing head as defined in claim 1, wherein each reflector is pivotal through an angle of approximately 45°.

5. A sensing head as defined in claim 1, including means for simultaneously and periodically interrupting the radiant energy incident on said detectors from the target.

6. A sensing head as defined in claim 1, including oscillating mechanical means in front of said reflectors for simultaneously and periodically interrupting radiant energy incident thereon from the target.

7. A sensing head as defined in claim 1, wherein each said detector unit includes means for protecting said detector when energy emanating from the sun is about to be incident on said detector.

8. A sensing head as defined in claim 1, wherein each said detector unit includes means responsive to energy emanating from the sun and incident on said detector unit for providing a signal, and means responsive to said last-mentioned signal for interposing a shutter in front of said detector.

9. A radiant energy detecting apparatus comprising:

a sensing head for generating signals indicative of the dynamic relationship, in each of two rectangularly related coordinate planes, of the line of sight between said head and a target, to a predetermined reference axis through said head, said sensing head comprising a first pair of reflectors on opposite sides of said reference axis for reflecting energy emanating from said target, a second pair of reflectors on opposite sides of said reference axis for reflecting energy emanating from said target, means for mounting the four reflectors of said pairs in quadrature about said axis and for pivotal movement about axes lying in a plane normal to said reference axis, a pair of detectors mounted on said sensing head for each pair of reflectors for receiving energy emanating from said target and reflected from said pair of reflectors and producing signals in response thereto, the pivotal position of the reflectors of each pair being effective to define an angle of view between the two detectors of each said pair of detectors, and means for simultaneously and in synchronism pivoting the four reflectors of said two pairs to increase and decrease the angle of view between the two detectors of each pair;

means for actuating said pivoting means to decrease said angle of view to seek a target; and means for stopping said actuating means when a signal from any one of said detectors exceeds a predetermined level.

10. An apparatus as defined by claim 9, including means for reversing said actuating means when said angle of view has reached its lower limit to cause said pivoting means to increase said angle of view, and means for stopping said actuating means when said angle of view has reached its upper limit.

11. A radiant energy detecting apparatus, comprising:
a sensing head for generating signals indicative of the dynamic relationship, in each of two rectangularly related coordinate planes, of the line of sight between said head and a target to a predetermined reference axis through said head, said sensing head comprising a first pair of reflectors on opposite sides of and equidistant from said reference axis for reflecting energy emanating from said target, a second pair of reflectors on opposite sides of and equidistant from said reference axis for reflecting energy emanating from said target, means for mounting the four reflectors of said pairs in quadrature about said axis and for pivotal movement about axes lying in a plane normal to said reference axis, a pair of detectors for each pair of reflectors, said pair of detectors being mounted on said sensing head for receiving energy emanating from said target and reflected from said pair of reflectors and producing signals in response thereto, said reflectors of each pair of reflectors being effective to define an angle of view for its respective pair of detectors according to the pivotal positions thereof on said axes, and means for simultaneously and in synchronism pivoting the four reflectors of said two pairs to increase and decrease the angle of view between the two detectors of each said pair;

means for actuating said pivoting means to decrease said angle of view to seek a target;

means for stopping said actuating means when a signal from any one of said detectors exceeds a first predetermined level; and means for reversing said actuating means to cause said pivoting means to increase said angle of view when signals from both detectors of said first pair exceed said first predetermined level and signals from both detectors of said second pair exceed a second predetermined level higher than said first predetermined level.

12. Apparatus as defined by claim 11, including means for stopping said actuating means if the signal from either detector of said first pair drops below said first predetermined level or the signal from either detector of said second pair drops below said second predetermined level.

13. Apparatus as defined by claim 12, including means for positively braking said pivotal means when said actuating means is stopped.

14. A radiant energy detecting apparatus, comprising:
a sensing head for generating signals indicative of the dynamic relationship, in each of two rectangularly related coordinate planes, of the line of sight between said head and a target to a predetermined reference axis through said head, said sensing head comprising a first pair of reflectors on opposite sides of and equidistant from said reference axis for reflecting energy emanating from said target, a second pair of reflectors on opposite sides of and equidistant from said reference axis for reflecting energy emanating from said target, means for mounting the four reflectors of said pairs in quadrature about said axis and for pivotal movement about axes lying in a plane normal to said reference axis, a pair of detectors for each pair of reflectors, said pair of detectors being mounted on said sensing head for receiving energy emanating from said target and reflected from said pair of reflectors and producing signals in response thereto, each of said pair of reflectors being effective to define an angle of view for its respective pair of detectors according to the pivotal position thereof on said axes, and means for simultaneously and in synchronism pivoting the four reflectors of said two pairs to increase and decrease the angle of view between the two detectors of each said pair;

means for actuating said pivoting means to decrease said angle of view to seek a target;

means for stopping said actuating means when a signal from any one of said detectors exceeds a first predetermined level; and means for reversing said actuating means to cause said pivoting means to increase said angle of view when signals from all four of said detectors exceed a second predetermined level higher than said first predetermined level.

References Cited by the Examiner

UNITED STATES PATENTS

| 2,421,476 | 6/1947 | Belar et al. | 178—7.92 |
| 2,489,305 | 11/1949 | McLennan | 250—235 X |
| 2,892,949 | 6/1959 | Hardy | 250—214 |
| 2,907,887 | 10/1959 | Beck | 250—214 |
| 2,966,823 | 1/1961 | Trimble | 88—1 |
| 2,997,594 | 8/1961 | MacNeille | 250—203 |
| 3,015,249 | 1/1962 | Taylor | 88—1 |
| 3,038,077 | 6/1962 | Gillespie et al. | 250—83.3 |

RALPH G. NILSON, *Primary Examiner.*

WALTER STOLWEIN, *Examiner.*